(12) United States Patent (10) Patent No.: US 8,332,146 B2
Rosing et al. (45) Date of Patent: Dec. 11, 2012

(54) METHOD AND SYSTEM FOR CHARACTERIZING RIDE EXPERIENCES

(75) Inventors: Howard S. Rosing, Naples, FL (US); Robert S. Rosing, Seattle, WA (US)

(73) Assignee: G-Tracking, LLC, Naples, FL (US)

( * ) Notice: Subject to any disclaimer, the term of this patent is extended or adjusted under 35 U.S.C. 154(b) by 610 days.

(21) Appl. No.: 12/482,344

(22) Filed: Jun. 10, 2009

(65) Prior Publication Data

US 2010/0318294 A1 Dec. 16, 2010

(51) Int. Cl.
*G01C 21/00* (2006.01)
(52) U.S. Cl. ........................................................ 701/468
(58) Field of Classification Search .................. 701/412, 701/418, 430, 451, 460, 468, 484, 502, 517
See application file for complete search history.

(56) References Cited

U.S. PATENT DOCUMENTS

2006/0181034 A1* 8/2006 Wilde et al. ................. 280/5.515
* cited by examiner

*Primary Examiner* — Kim T Nguyen
(74) *Attorney, Agent, or Firm* — Arnall Golden Gregory LLP

(57) ABSTRACT

The invention provides a monitoring device and its method of use for characterizing and evaluating the recreational quality of a ride event, based on velocity, g-forces, and vertical and lateral movement. The device optionally takes measurements for an individual ride event, displays and stores them, and if desired, transmits them to a central server for storage and or dissemination. The device can thereby document experience characteristics and scores for each ride, optionally reflecting personal preferences in the ratings. The stored data may be used for personal or managerial applications.

8 Claims, 5 Drawing Sheets

Schematic caricature depicting an illustrative integrated system for a SMTD.

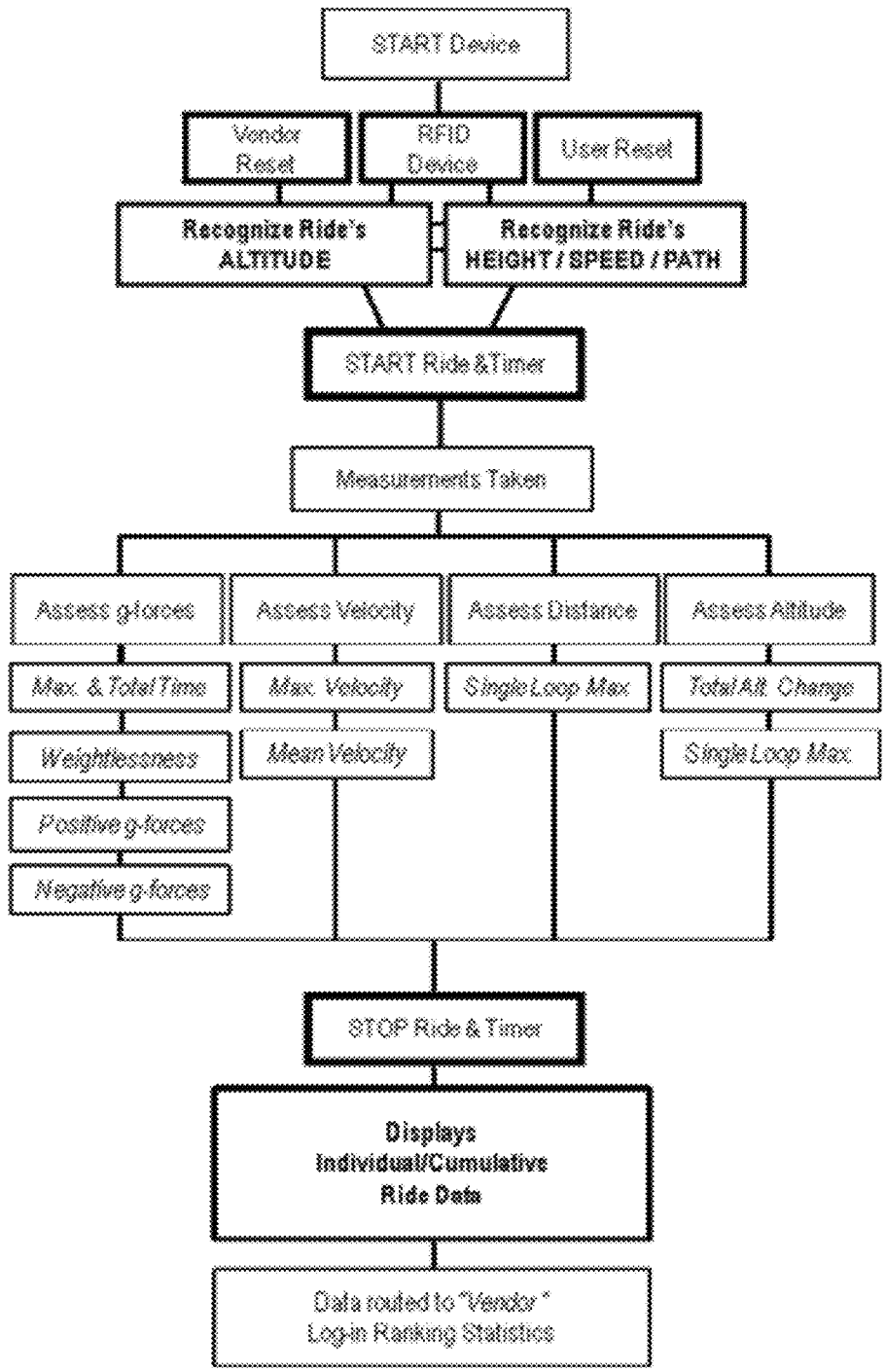
FIG. 1: Illustrative communication network for device data.

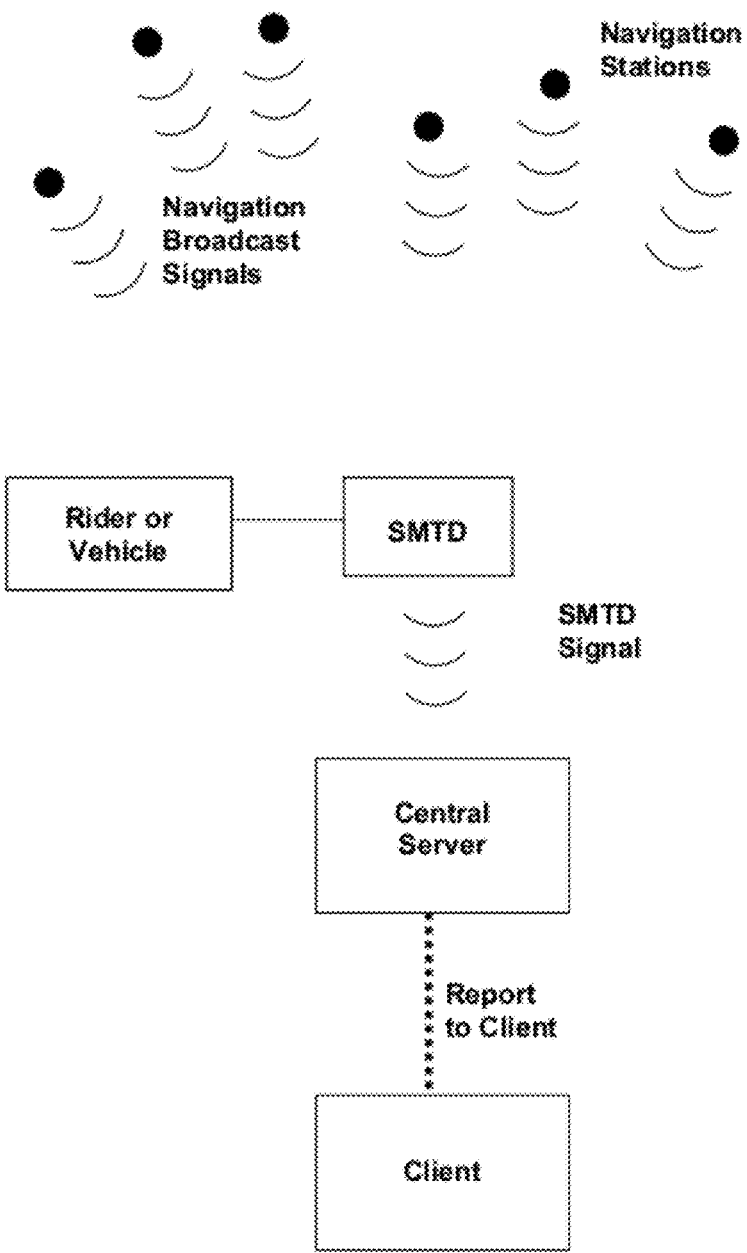
FIG. 2: Schematic caricature depicting an illustrative integrated system for a SMTD.

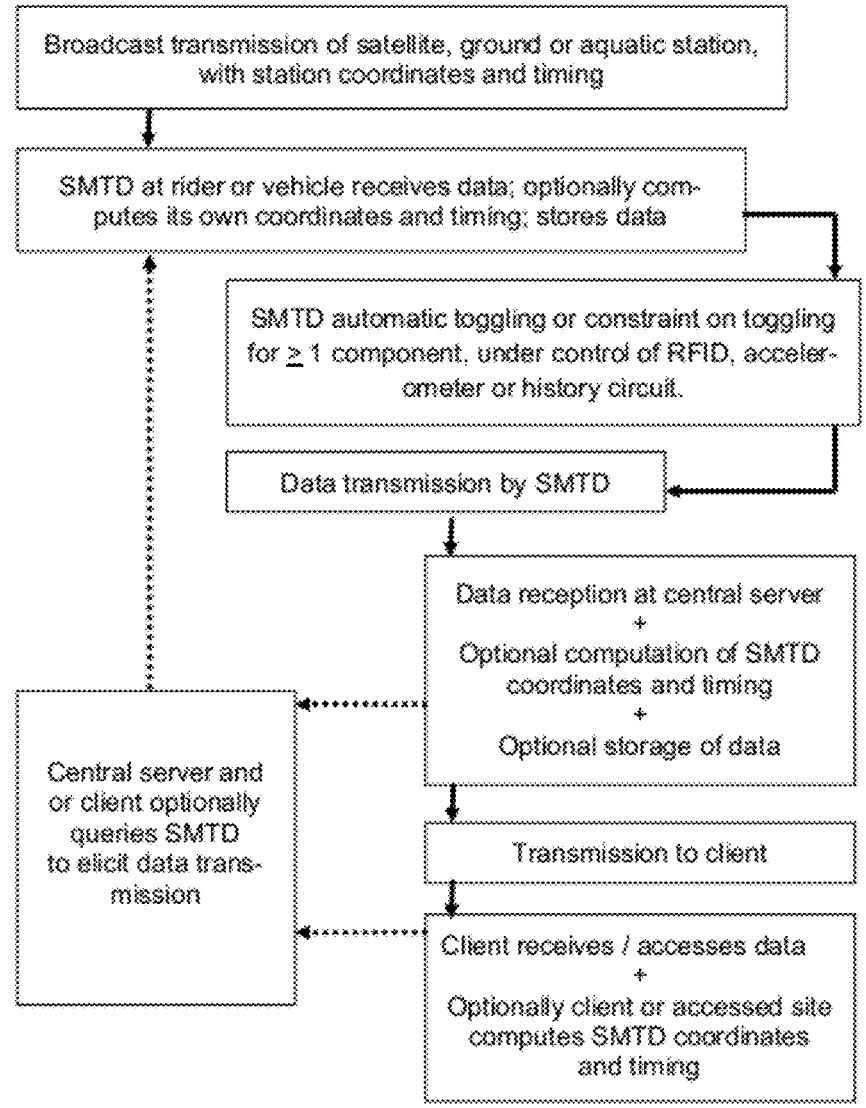
FIG. 3: Flow diagram depicting illustrative integrated data communications of a SMTD.

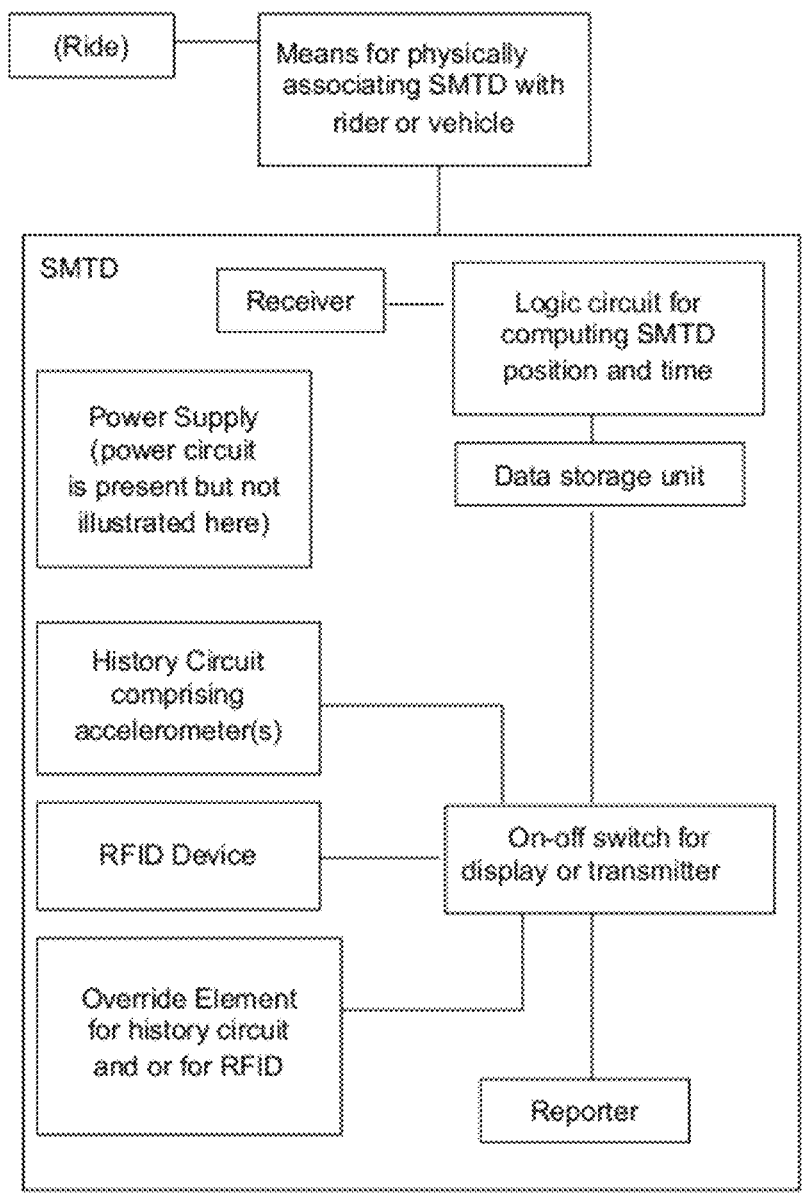
FIG. 4: Schematic caricature for an illustrative circuit of a SMTD.

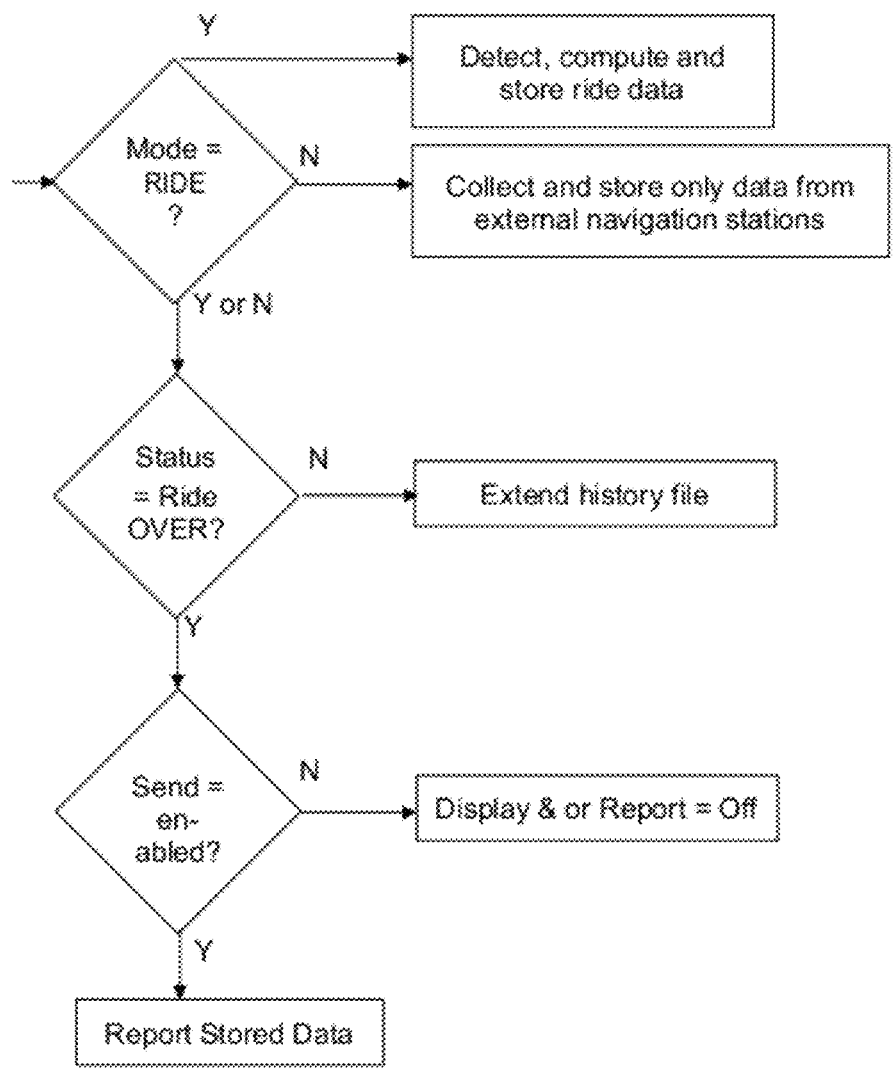
FIG. 5: Illustrative flow diagram for signal processing in a SMTD.

METHOD AND SYSTEM FOR CHARACTERIZING RIDE EXPERIENCES

FIELD OF THE INVENTION

The invention relates in general to a method and system for characterizing the quality of experience of a device rider as a function of physical parameters and personal preferences. The invention relates particularly to rapid assessment of ride quality by means of self-motion detecting circuits in electronic communication with one or more devices for storing, reporting and managing the ride information.

BACKGROUND OF THE INVENTION

It is common for competitors in athletics, motorsports and extreme sports to speak of their "need for speed." When training or reminiscing, they characterize their personal best performances in terms of time, speed, strength, height ascended, distance covered, twists made, and other parameters. Examples include skiers, cyclists, skaters, rodeo performers, auto racers, speed boaters, competitive pilots, and others. Racing performance has historically been measured by time at the finish line, and in some cases also by the time "splits" at critical junctures. Radar guns, laser guns, and similar devices are also widely used to gauge speeds. And such competitors typically track their improvements on a close and regular basis, for which a myriad of tools are available. These include not only straightforward devices such as pedometers and stop-action film, but also sports watches in which a large number of functions are included. E.g., High Gear's backlit Axio watch includes an altimeter sensor (−2,305 to 30,045 feet), barometer (300 to 1100 mbar/hPa), thermometer (14 to 122 F), chronograph (99 hour), and an array of alarms (for rest, hydration and altitude). Silva's TraiLeader 2Tech4o watch includes an accelerometer (for speed in mph and distance during runs to 0.001 mile), compass, altimeter (1 foot resolution, with path graphed for 8 hours), barometer (1 Mbar resolution, with 30 hour chart), thermometer, chronograph for lap or trail times (99 laps, 0.01 second resolution), countdown timer. Users include, for instance, participants in the day and evening events of the X (for "extreme") Games, described by sports broadcast network ESPN as an annual competition of the greatest winter and summer action sport athletes from around the world, all competing for gold, silver and bronze medals and prize money; the winter events include skiing, snowboarding, and snowmobiling; the summer events include skateboarding, BMX, in-line skating and sport-climbing.

By contrast, a large portion of the population satisfies its "need for speed" in a way that requires less physical effort and training. These include enthusiasts for roller coasters and other amusement park rides, as well as for sky diving, hang gliding, hot air balloons, cars, planes, trains and boats. Many of these are not racing per se, and they have no need to improve competitive performance. And yet they have no less enthusiasm for knowing and quoting the height, speed, momentum, hang time, g-forces or other performance parameters, just as many baseball fans memorize event statistics in an encyclopedic way. For instance, some roller coaster enthusiasts have memorized the heights, lengths, top speeds, and or duration of weightlessness for coaster rides at parks around the world. However whereas competitive sports have many tools to characterize the quality of experience precisely and objectively, there are far fewer such tools for the non-competitive demographic. Consequently, roller coaster enthusiasts and other passengers with a taste for speed often have only a memory, photograph, calculation, or boilerplate commercial description by which to recite the quality of their experience. Moreover part of their enjoyment is in knowing their speed and other parameters in real time, and in having the data as a technical snapshot and highly personalized memento of the experience, especially because no trip is completely identical to another. The trip data can vary across a wide spectrum and in customized ways during the ride because the fastest coaster runs at 128 m.p.h., the tallest is 456 feet, the steepest angle of descent is 90 degrees, and the longest course is over 8,133 feet. Moreover some ride enthusiasts have become aware that they need to limit their exposure to certain extremes in rides, due to a proclivity toward hematomas or other medical afflictions, so they have a different reason for a keen interest in knowing their ride parameters.

It is thus surprising that almost no ride-centric personal technology has emerged to serve the tastes and heighten the experience of the many enthusiasts of thrill rides. In a recent year the 30 U.S. parks under the Six Flags brand entertained over 40 million visitors, and Six Flags is hardly the only operator of amusement parks. Few if any of those visitors had personal ride enhancement technology. Moreover amusement parks provide just a small number of the many ways in which Americans and others seek their thrills by settling in for a high or fast ride. Thus there is a large and ongoing need for devices that can accurately characterize the experience of non-competitive riders in real time.

BRIEF DESCRIPTION OF THE INVENTION

The invention provides a mobile monitoring device for characterizing and evaluating the quality of a non-competitive ride experience, based on velocity, g-forces, and vertical and lateral movement. The device is borne on the user's person, such as with a wrist strap, on a belt, or in a pocket or purse, or may be attached, e.g., to a ride vehicle. The device records changes in velocity and or g-forces, as well as periods of weightlessness, the length of time of the ride and altitude changes during the ride. Specifically, reported parameters optionally include but are not limited to data on speed (maximum and average), g-forces (such as minima, maxima, and total), number of loops or inversions, time of "ballistic" weightlessness, total distance traveled, altitude changes (maximum on a single loop, fastest single change, longest single change, and total changes), temperature, humidity and air pressure. The measurements are optionally taken for an individual ride event, displayed and stored on the device, and if desired, transmitted to a central server for storage and or dissemination. The device can thereby provide totals and maximum scores for each ride. The stored data may be used for personal record keeping, ranking rides relatively based on personal criteria, analyzing rides, and mining data about riders. Contemplated users for the device include but are not limited to users of roller coasters and other wild rides; users of passive airborne vehicles such as parachutes, hang gliders and hot air balloons; pilots; passengers in planes, trains, land vehicles, boats under sail and boats under power; drivers of off-road vehicles such as all-terrain vehicles, motocross bikes, dune buggies and snowmobiles; scuba and deep sea divers; businesses that rent out one or more of the vehicles above; and participants in non-competitive sporting environments. Novel aspects of the invention include the portable device, its use in a particularized system network, the method for using the device, and its use for characterizing recreational ride events.

The present invention provides a self-motion tracking device (SMTD) that uses sensors and optionally navigation system technology to characterize the recreational features of motion for riders and their vehicles, optionally under pre-programmed conditions. In one embodiment the SMTD is placed in or on a recreational ride vehicle. The SMTD has components that can detect accelerations and optionally receive a signal bearing position information from a location such as a satellite or ground station or aquatic station. The SMTD then stores information, and when permitted, reports information. The SMTD's output is optionally toggled off or on by an accelerometer or other meter respectively during (or prior to or following) departure of vehicle, or is prevented from toggling on during travel, such that the output reporting signal is disabled when the vehicle travel conditions are outside those of interest. The ranges of interest may optionally be defined in terms of forward and or lateral acceleration, speed, time, or geographic boundaries. SMTDs of the invention are designed for recreational riders but have features that competitive riders would find useful, and competitive use is contemplated by the invention.

When the SMTD is enabled its output signal may be transmitted to a central server continually, periodically or on demand. In the toggled-on mode the SMTD report communicates information on the motion, path, angle, position, and this optionally includes information about the time, date, speed or acceleration related to the SMTD's position or history of positions, as well as personal preferences and journal information. When the motion information is optionally sent to and received at a central server, a client receives a report by telecommunication such as by telephone, email, text message, voice message, transmission to a hand-held navigational device, posted entry at a client-accessible website, or other media. The actual motion of the rider or vehicle may be computed at the SMTD unit, at the central server, or at a journaling device or website accessible to the client, or by some combination of these.

In one illustrative embodiment the invention is a method for assessing and reporting the characteristics of a recreational ride event, comprising:
a) placing a self-motion tracking device (SMTD) in close proximity to a recreational rider or recreational ride vehicle;
b) determining information about the relative motion and or position at a first component of the SMTD;
c) storing motion information from the first component at a second component of the SMTD; and
d) reporting and optionally qualifying motion information from the first component at a third component of the SMTD;
wherein the SMTD's self-motion tracking employs one or more accelerometers optionally in combination with a chronometer in a history circuit, and optionally employs a navigational circuit, and wherein one or more of the first, second and third components is optionally under the control of an override element or a component that can respond to radiofrequency identification signals.

In a second illustrative embodiment the invention is a method for logging the motion of a rider or vehicle, comprising:
a) receiving a transmission of position information from a satellite, ground station or aquatic station at a first component of a self-motion tracking device (SMTD) that is in close proximity to a rider or vehicle;
b) detecting information about the SMTD's own motion at a second component of the SMTD;
c) storing the information about motion or position at a third component of the SMTD;
d) optionally calculating the position of the rider or vehicle based on the position information received from the satellite or ground station, wherein the calculation is performed at a fourth component of the SMTD;
e) transmitting a signal from the SMTD to a central server to report position information;
f) optionally calculating the path and or motion history of the rider or vehicle at a component of the central server based on the position information received by the SMTD from the satellite, ground station or aquatic station, if the position of the rider or vehicle had not been calculated at a component of the SMTD; and
g) reporting motion information from the central server electronically to a client communications device, email address, handheld navigational device or client-accessible web page entry;
wherein motion information received at the SMTD is processed to determine the path and or motion of the rider or vehicle by means of a computation at the SMTD, the central server, the handheld navigational device, the client-accessible web page, or a combination thereof.

In a third illustrative embodiment, the invention is a self-reporting tracking unit, wherein the unit comprises a rider or vehicle in close proximity to a self-motion tracking device (SMTD), and wherein the SMTD comprises:
a) a component that can measure a physical characteristic of self-motion pertaining to the rider or vehicle;
b) optionally a component that can receive transmissions of position information, and optionally a GPS-INS device;
c) a component that can store motion information and or position information;
d) a component that can report motion and or position information; and
e) optionally a component that can respond to radiofrequency identification signals;
wherein the components that measure self-motion, receive transmissions, store information, report information, and respond to radiofrequency identification signals are in electrical communication with one another; and wherein the storing component stores data from the measuring and receiving components, the reporting component reports the measured and received data, and the responding component can receive instructions and activate or deactivate the other components.

In a fourth illustrative embodiment, the invention is an integrated system for logging the motion or ride performance of a recreational rider or recreational vehicle, comprising:
a) the rider or vehicle;
b) a self-motion tracking device (SMTD) in close proximity to the rider or vehicle, wherein the SMTD comprises the following components in electrical communication with one another:
i) a component that can measure a physical characteristic of self-motion pertaining to the rider or vehicle;
ii) optionally a component that can receive transmissions of position information from a navigation station;
iii) a component that can store motion and or position information;
iv) a component that can report motion and or position information; and
v) optionally a component that can respond to radiofrequency identification signals to activate or deactivate one or more of the other components;
c) a central server that can receive the reported information about motion or position; and d) a means for communicating the motion and or position information electronically to a client from the central server.

In yet another embodiment the invention is a method and device for tracking user preferences, journaling and feedback on motion experiences in rides, wherein the information is reported to a personal ride journal, to a ride vendor, or to other observers who have an interest in ride quality for personal or professional reasons.

BRIEF DESCRIPTION OF THE DRAWINGS

FIG. 1 is a block diagram depicting an illustrative network according to the invention for detecting and reporting ride data.

FIG. 2 is a schematic caricature depicting an illustrative integrated system according to the invention for collecting and reporting data.

FIG. 3 is a flow diagram depicting an illustrative integrated system of data flows according to the invention for reporting data on a ride FIG. 4 is a schematic caricature for an illustrative circuit of a SMTD according to the invention.

FIG. 5 is a flow diagram depicting illustrative signal processing in a SMTD according to the invention.

DETAILED DESCRIPTION OF THE INVENTION

Riding for the mere thrill of it has been an amusement probably since the first human use of horses or water vessels, but thrill rides based on sophisticated engineering are a more recent development. To demonstrate the diversity of need for the invention and to provide illustrative uses, roller coasters will be used as an example, but not an exclusive one. It is to be understood that the invention has similar uses for large mechanical slings, swings and Ferris Wheels, as well as for aerial recreation such as motor-propelled flying, parachuting and hang gliding, and for many other types of recreational rides as well.

Roller coasters emerged in the 17$^{th}$ century Saint Petersburg, where slides on wooden supports were built on engineered hills of ice up to 80 feet in height with a drop angle of 50 degree. In several languages coasters are still referred to as "Russian mountain". More sophisticated (i.e., "real") roller coasters were built in Russian by royal order in 1784. And in 1812, wheeled cars were securely locked to a fast track with guide rails for a coaster built in Paris. Since that time amusement parks have competed to outdo each other in the height, speed and g-forces of the rides, which are designed to feel risky to the human sense of balance even though they are engineered to be safe. The first roller coasters were of wooden construction, and many parks continue to construct new wooden coasters, but today many others are steel. Both materials give admirable rides, but with somewhat different characteristics, and both are enormously popular with visitors.

A roller coaster comprises a track whose lines rise and fall in designed patterns, and may have one or more inversions (such as vertical loops) that briefly turn the rider upside down. Passengers are mechanically harnessed into the seats of a train of one or (usually) more cars. Typically the cars are not self-powered but pulled by chain or cable to the peak of the first hill on the track. They then have sufficient potential energy at that height to complete the remainder of the course when the force of gravity conveys kinetic energy on the other side. Some energy is lost to friction, so designs specify that the next hill is lower so that the car can get over it without assistance from a cable, and so forth for additional hills.

Generally the cars have enough speed to complete the entire course in that manner. Instead of an initial lift hill, however, some rides launch riders with a flywheel, linear induction motors, linear synchronous motors, hydraulic launch, compressed air launch or drive tire: some such launches attain higher speeds in a shorter length of track than from use of a conventional lift hill. Some roller coasters move back and forth along the same section of track; these are known as shuttles, and they usually run the circuit once with riders moving forward and then backwards through the same course. For marketing purposes, each roller coaster is generally designed to be unique and given an adventuresome personality name, so a large variety of coaster circuits and shuttles exist. Even each trip is unique. The speed of the ride at each point is subject to conditions, including winds and the friction on the track (e.g., from debris or humidity). Brakes or alternatively motors bring the train to a complete stop at the end of the circuit, though in some design the train is allowed to "valley", i.e., to roll back and forth between two hills until it loses energy and comes to a stop. Valleying is also popular in rides that feature inchoate launches at the beginning of the ride, i.e., the coaster needs to be launched twice.

Roller coaster design is a combination of architectural art and engineering, with adaptations to avoid over-stressing the body or making the ride dangerous or uncomfortable. This includes issues of jerk (whiplash must be avoided), in which passengers must sense stress changes and adjust their muscle tension accordingly in advance. Also, there is a limit to the gravitational forces (g-forces) that humans can endure. Being forced downward into the seat they can endure the most: positive 6 g. When gravity is counterbalanced by upward momentum, riders have a sense of weightlessness and are pushed out of their seat by centrifugal force; here g-forces of −1.5 to −2.0 are the usual design limit because riders find this most difficult. Lateral g-forces, for instance when rounding a curve, are in the same range: usually no more than 1.5 g, though 1.8 g has been used: the high values can make the ride feel rough and uncomfortable.

Coaster rides are classified by the height and design of the track. A "megacoaster" generally has a complete circuit with a lift hill or drop between 200 feet (61 m) and 299 feet (91 m) high; the drop distance is local, not the overall change in height along the circuit. The world's first megacoaster was Magnum XL-200 at Cedar Point. The term "hypercoaster" can mean a megacoaster; but alternatively refers to a shuttle coaster that may not necessarily have such a high drop, lacks inversions and is designed for speed and airtime (negative G-forces).

A "gigacoaster" has a complete circuit, and a height of between 300 feet (91 m) and 399 feet (122 m). This was a marketing term coined in 2000 by Cedar Point in conjunction with ridemaker Intamin AG of Switzerland, for their coaster Millennium Force. A second gigacoaster Steel Dragon 2000, also opened in 2000 and held the record for world's longest roller coaster.

A "stratacoaster" (also from Intamin) has a complete circuit and a height between 400 feet (120 m) and 499 feet (152 m). The first stratacoaster (Top Thrill Dragster at Cedar Point) has a height of 420 feet (130 m) and opened in 2003. The second (Kingda Ka at Six Flags Great Adventure) has a height of 456 feet (139 m) and opened in 2005. 400-plus foot coaster had been built earlier (Tower of Terror, Dreamworld Australia; Superman: The Escape, Six Flags Magic Mountain) but are not considered stratacoasters because they shuttle and the ride altitude changes by only by 328 feet.

The substantial variation is illustrated below by the tables of world records for coasters.

TABLE 1

Tallest continuous-circuit steel roller coasters (in feet)

| Name | Park | Location | Value |
|---|---|---|---|
| Kingda Ka | Six Flags Great Adventure | Jackson Township, NJ | 456 |
| Top Thrill Dragster | Cedar Point | Sandusky, OH, | 420 |
| Steel Dragon 2000 | Nagashima Spa Land | Nagashima, Mie, Japan | 318 |
| Millennium Force | Cedar Point | Sandusky, OH, | 310 |
| Thunder Dolphin | LaQua | Tokyo, Japan | 263 |
| Fujiyama | Fuji-Q Highland | Fujiyoshida, Yamanashi, Japan | 259 |
| Eejanaika | Fuji-Q Highland | Fujiyoshida, Yamanashi, Japan | 249 |
| Titan | Six Flags Over Texas | Arlington, TX | 245 |
| Silver Star | Europa-Park | Rust, Baden Wuerttemberg, Germany | 240 |
| Goliath | Six Flags Magic Mountain | Valencia, CA | 235 |

TABLE 2

Tallest steel roller coaster drop heights (in feet)

| Name | Park | Location | Value |
|---|---|---|---|
| Kingda Ka | Six Flags Great Adventure | Jackson Township, NJ | 418 |
| Top Thrill Dragster | Cedar Point | Sandusky, OH | 400 |
| Tower of Terror | Dreamworld | Coomera, Queensland, Australia | 328 |
| Superman: The Escape | Six Flags Magic Mountain | Valencia, CA | 328 |
| Steel Dragon 2000 | Nagashima Spa Land | Nagashima, Mie, Japan | 307 |
| Millennium Force | Cedar Point | Sandusky, OH | 300 |
| Goliath | Six Flags Magic Mountain | Valencia, CA | 255 |
| Titan | Six Flags Over Texas | Arlington, TX | 255 |
| Behemoth | Canada's Wonderland | Vaughan, Ontario, Canada | 230 |
| Fujiyama | Fuji-Q Highland | Fujiyoshida, Yamanashi, Japan | 230 |

TABLE 3

Tallest wooden roller coasters (in feet)

| Name | Park | Location | Value |
|---|---|---|---|
| Son of Beast | Kings Island | Mason, OH | 218 |
| Colossos | Heide Park | Soltau, Lower Saxony, Germany | 196 |
| T Express | Everland | Yongin, Gyeonggi-do, S. Korea | 184 |
| El Toro | Six Flags Great Adventure | Jackson Township, NJ | 181 |
| Rattler | Six Flags Fiesta Texas | San Antonio, TX | 179 |
| The Voyage | Holiday World & Splashin' Safari | Santa Claus, IN | 173 |
| Mean Streak | Cedar Point | Sandusky, OH | 161 |
| Texas Giant | Six Flags Over Texas | Arlington, TX | 143 |
| White Cyclone | Nagashima Spa Land | Kuwana, Mie, Japan | 139 |
| Hades | Mt. Olympus Water & Theme Park | Wisconsin Dells, WI | 140 |

TABLE 4

Tallest wooden roller coaster drop heights (in feet)

| Name | Park | Location | Value |
|---|---|---|---|
| Son of Beast | Kings Island | Mason, OH | 214 |
| El Toro | Six Flags Great Adventure | Jackson Township, NJ | 176 |
| Colossos | Heide Park | Soltau, Lower Saxony, Germany | 159 |
| Mean Streak | Cedar Point | Sandusky, Ohio, USA | 155 |
| The Voyage | Holiday World & Splashin' Safari | Santa Claus, IN | 154 |
| T Express | Everland | Yongin, Gyeonggi-do, S. Korea | 151 |
| The Boss | Six Flags St. Louis | Eureka, MO | 150 |
| American Eagle | Six Flags Great America | Gurnee, IL | 147 |
| The Beast | Kings Island | Mason, OH | 141 |
| Hades | Mt. Olympus Water & Theme Park | Wisconsin Dells, WI | 140 |

TABLE 5

Tallest vertical loops (in feet)

| Name | Park | Location | Value |
|---|---|---|---|
| Superman: Krypton Coaster | Six Flags Fiesta Texas | San Antonio, TX | 145 |
| Viper | Six Flags Magic Mountain | Valencia, CA | 140 |
| Dominator | Kings Dominion | Doswell, VA | 135 |
| Scream! | Six Flags Magic Mountain | Valencia, CA | 128 |
| Medusa | Six Flags Discovery Kingdom | Vallejo, CA | 128 |
| The Riddler's Revenge | Six Flags Magic Mountain | Valencia, CA | 124 |
| Chang | Six Flags Kentucky Kingdom | Louisville, KY | 121 |
| Mantis | Cedar Point | Sandusky, OH | 119 |

TABLE 6

Fastest steel roller coasters (in miles per hour)

| Name | Park | Location | Value |
|---|---|---|---|
| Kingda Ka | Six Flags Great Adventure | Jackson Township, NJ | 128 |
| Top Thrill Dragster | Cedar Point | Sandusky, OH | 120 |
| Dodonpa | Fuji-Q Highland | Fujiyoshida, Yamanashi, Japan | 106.9 |
| Tower of Terror | Dreamworld | Coomera, Queensland, Australia | 100 |
| Superman: The Escape | Six Flags Magic Mountain | Valencia, CA | 100 |
| Steel Dragon 2000 | Nagashima Spa Land | Kuwana, Mie, Japan | 95 |
| Millennium Force | Cedar Point | Sandusky, OH | 93 |
| Goliath | Six Flags Magic Mountain | Valencia, CA | 85 |
| Titan | Six Flags Over Texas | Arlington, TX | 85 |
| Furius Baco | PortAventura | Salou, Tarragona, Catalonia, Spain | 83.9 |

TABLE 7

Fastest wooden roller coasters (in miles per hour)

| Name | Park | Location | Value |
|---|---|---|---|
| Son of Beast | Kings Island | Mason, OH | 78.4 |
| Colossos | Heide Park | Soltau, Lower Saxony, Germany | 74.6 |
| El Toro | Six Flags Great Adventure | Jackson Township, NJ | 70 |
| The Voyage | Holiday World & Splashin' Safari | Santa Claus, IN | 67.4 |
| The Boss | Six Flags St. Louis | Eureka, MO | 66.3 |
| American Eagle | Six Flags Great America | Gurnee, IL | 66 |

TABLE 7-continued

Fastest wooden roller coasters (in miles per hour)

| Name | Park | Location | Value |
| --- | --- | --- | --- |
| Mean Streak | Cedar Point | Sandusky, OH | 65 |
| Rattler | Six Flags Fiesta Texas | San Antonio, TX | 65 |
| The Beast | Kings Island | Mason, OH | 64.8 |
| T Express | Everland | Yongin, Gyeonggi-do, S. Korea | 64.6 |

TABLE 8

Longest steel roller coasters (in feet)

| Name | Park | Location | Value |
| --- | --- | --- | --- |
| Steel Dragon 2000 | Nagashima Spa Land | Kuwana, Mie, Japan | 8,133 |
| Daidarasaurus | Expoland | Osaka, Japan | 7,677 |
| Ultimate | Lightwater Valley | Ripon, N. Yorkshire, England | 7,442 |
| Fujiyama | Fuji-Q Highland | Fujiyoshida, Yamanashi, Japan | 6,708 |
| Millennium Force | Cedar Point | Sandusky, OH | 6,595 |
| California Screamin' | Disney's California Adventure Park | Anaheim, CA | 6,072 |
| Desperado | Buffalo Bill's | Primm, NV | 5,843 |
| Steel Force | Dorney Park & Wildwater Kingdom | Allentown, PA | 5,600 |
| Mamba | Worlds of Fun | Kansas City, MO | 5,600 |
| Superman el Último Escape | Six Flags México | Tlalpan, Mexico City, Mexico | 5,577 |

TABLE 9

Longest wooden roller coasters (in feet)

| Name | Park | Location | Value |
| --- | --- | --- | --- |
| The Beast | Kings Island | Mason, OH | 7,359 |
| Son Of Beast | Kings Island | Mason, OH | 7,032 |
| The Voyage | Holiday World & Splashin' Safari | Santa Claus, IN | 6,442 |
| White Cyclone | Nagashima Spa Land | Kuwana, Mie, Japan | 5,577 |
| Mean Streak | Cedar Point | Sandusky, OH | 5,427 |
| T Express | Everland | Yongin, Gyeonggi-do, S Korea | 5,384 |
| Shivering Timbers | Michigan's Adventure | Muskegon, MI | 5,383 |
| Jupiter | Kijima Amusement Park | Beppu, Ōita, Japan | 5,249 |
| Rattler | Six Flags Fiesta Texas | San Antonio, TX | 5,080 |
| The Boss | Six Flags St. Louis | Eureka, MO | 5,051 |

With such a diversity in the ranges and extremes of ride conditions, there is thus considerable interest among ride enthusiasts in the "performance" and distinctions for each of their ride events, in fact riders will reenter a favorite ride repeatedly in succession. Clubs of ride fans exist to disseminate information and to trade notes on the latest ride technology; an example is the American Coaster Enthusiasts (ACE), which has an online presence at http://www.aceonline.org/, there are also other clubs.

The invention will now be described in detail. The following definitions are used throughout this description.

The terms "ride" (as a verb or noun), "ride event," and "recreational ride event," as used herein refer to ride events that offer sheer enjoyment of motion. The term inclusively contemplates but is not limited to the following: roller coasters and other mechanical rides and "wild rides" in amusement parks; rapid descents as on water slides, whitewater rafting, bungee jumping, and freefall parachuting; use of passive vehicles such as parachutes, hang gliders, hot air balloons, sailing and sailboarding; piloting or riding motorized vehicles for the pleasure of motion, as for planes, trains, land vehicles, and boats under power; driving ground vehicles off-road such as all-terrain vehicles, BMX and motocross bikes, dune buggies and snowmobiles; surf activities such as surf activities such as surfing, water skiing, scuba and deep sea diving; snow activities such as skiing, snowboarding and bobsledding; skating activities such as in-line skating, ice skating, and skateboarding; and the like. The term ride event encompasses not just the ride but the businesses that rent out one or more of the vehicles above; and participants in sporting environments such as non-competitive sporting environments.

The term "self-motion tracking device (SMTD)" as used herein refers to a device for measuring, monitoring, storing and reporting information on the physical characteristics of a user's motion, or the motion of a vehicle that the user is riding.

The term "rider" as used herein with respect to the invention refers to a participant in a ride event, and includes passengers as well as persons who steer such rides while riding the associated vehicle.

The term "vehicle" as used herein with respect to the invention refers to the vehicle or other instrument for a ride event. For instance, on a roller coaster ride the vehicle is the coaster; on a parachute ride the vehicle is the parachute, etc.

The term "close proximity" as used herein with respect to the invention refers to use of a device in a manner and at a positioning that is sensitive to the motion actually experienced by the vehicle or rider. Thus in non-exclusive illustrative embodiments, an SMTD according to the invention may be handheld; or worn as a pin, bracelet, chain, ring, patch, or item of clothing; or carried in a pocket, pouch or purse; or worn on a wrist strap or belt, or attached to the interior or exterior of the vehicle; or housed in a compartment of the vehicle; or affixed as an integral component of the vehicle; or free-standing.

The term "motion" as used herein with respect to the invention refers to the motion of a ride and to the position or change of position of the rider relative to the motion. The term includes the rider's angle of inclination relative to the motion, lateral angle during the movement, twist, torque, acceleration and deceleration, response to centrifugal force, and so forth.

The term "seatward," "forward," and "lateral," as used herein with respect to force have the following meanings. "Seatward" force refers to acceleration that presses a sitting rider down into the seat. "Forward" force refers to both accelerating and decelerating forces that act along the direction of the ride path. "Lateral" force refers to force that tends to push a rider sideways, as in cornering. Forces referred to as angular, spinning, twisting, twirling, or the like in the context of torque refer to forces that have the effect of tending to rotate the rider in a way that is more substantial than completing a loop or circuit.

The term "position" or "location" as used herein with respect to a rider's path are synonymous and refer to navigational position, i.e., geographic position during a ride.

The term "self-locating" as used herein refers to autonomous detection and optionally transmission of position information that is relevant to characterizing a ride. In particular the term self-locating is used here in with respect to SMTDs and ride features that are tracked by means of SMTDs.

The terms "tracking" and "monitoring" are used synonymously herein, and refer to identifying the location or movement history of a rider or ride vehicle.

The term "physical characteristic" as used herein with respect to motion and the invention refers to a measurable physical parameter such as acceleration (positive or negative), velocity, momentum in the direction of travel, angular momentum, position, torque, or another objective physical characteristic of a rider's motion. As used herein these subordinate have their usual and ordinary meaning in physics.

The terms "history," "motion history," and "cumulative history" as used herein refer to a cumulative record of one or more physical characteristics of motion.

The term "history circuit" as used herein refers to a circuit that recognizes a relationship between ride events in proper sequence by means of an accelerometer or a circuit under the control of an accelerometer.

The term "constrains" or "constraint" as used herein with respect to a history circuit and toggling refers to the use of a history circuit in an electronic switch that can toggle a SMTD on or off in response to a threshold value for a physical parameter.

The term "override" as used herein refers to a manual or remote reversal of the activation status for an NSBD transmitter, i.e., toggling on or off in a manner contrary to the autonomous position dictated by an accelerometer or history circuit that normally governs the on/off mode.

The terms "mobile" and "portable" as used herein with respect to devices according to the present invention refer to a unit that may, e.g., be handheld, however it would not depart from the spirit of the invention to affix such mobile or portable units permanently, e.g., to the side of a ride vehicle.

The terms "measuring" and "determining" as used herein refer generally to measurement of a physical property of motion unless the context indicates otherwise. The term "assessing" as used herein refers to measuring, or to evaluating ride quality by both objective and subjectively programmed criteria.

The terms "storing" and "logging" as used herein with respect to position or motion information under the invention refers to storing such information temporarily or permanently; this includes but is not limited to use on electronic media. The terms optionally include storing of motion information that has been processed or transformed for useful reporting to a user. The terms include but are not limited to storing information about events in their chronological order of occurrence.

The term "reporting" as used herein with respect to motion information under the invention refers to providing such information to a user, optionally in revised or calculated form, and optionally includes transmission of such information to a remote location as, e.g., to a central server, website, or personal telecommunication device. The term "periodic" as used herein with respect to reporting refers to reporting on a prescheduled basis, e.g., at certain points during the day. As used herein, reporting in response to a query refers to reporting after a specific contact by a user or third party. As used herein, reporting under the control of an accelerometer refers to reporting information in response to observation of a threshold value in one or more physical characteristics of motion; the reporting criteria may be pre-programmed by the device's maker, or entered by a user or client. As the term is used herein, reporting may be by visual display, auditory announcement, transfer of information bits by telephonic landline, wireless transmission of raw or processed data, or other form of data communication.

The term "component" as used herein with respect to an SMTD according to the invention refers to a functional unit or circuit feature including but not limited to a mechanical sensor, circuit board, computer processing unit, designated memory space, or other identifiable component in a computer circuit for performing the respective function. Functions of such components may include but are not limited to detecting or measuring a physical parameter such as, for example, acceleration or speed; receiving; storing; transmitting; computing; switching or the like. When in use an SMTD comprises or is in electrical connection with a power source such as a battery, hardwired electrical outlet, fuel cell, super capacitor, electrochemical capacitor, induction coil, generator, solar collector, self-winding mechanism, or other power supply.

The term "qualifying" as used herein with respect to motion information refers to filtering motion information and optionally rating a ride event by specific criteria, wherein the criteria may optionally represent entered personal preferences, and the qualified information may optionally represent feedback on a ride experience for subsequent use for personal or professional purposes.

The term "accelerometer" as used herein refers to a device for sensing acceleration or deceleration, and has its usual and ordinary use in physics and engineering. The term "accelerometric" as used herein refers to the capacity of a device to detect such acceleration or deceleration.

The terms "under the control of an accelerometer," "under the control of a circuit containing an accelerometer," "under the control of a circuit comprising an accelerometer," and like terms refer to a circuit for which a component or function is activated or deactivated directly or indirectly by the response of an accelerometer to detected levels of acceleration and or deceleration. As used herein the terms defined in this paragraph may optionally refer to reporting of information, transmission, computing values, and other functions of circuits. As used herein, non-exclusive examples of types of reporting under the control include: controlled continuous reporting of information; reporting for a detected or computed threshold level of acceleration or deceleration; reporting in response to a threshold end velocity such as where the acceleration or deceleration is determined over a specific time; and reporting in response to another physical parameter that can be determined with the aid of an accelerometer. As used herein these defined terms include but are not limited to embodiments in which a switch for a SMTD comprises a plurality of independent alternative means to measure a threshold level of velocity or other physical parameter, wherein at least one of those alternative independent means comprises an accelerometer.

The term "chronometer" as used herein refers to a device for gauging the passage of time, and in an embodiment herein is used in contemplation of relating a sequence of events and calculating speeds and distances in light of acceleration data over time.

The term "history circuit" as used herein" refers to a circuit for a device according to the invention, in which the circuit is capable of logging and storing a sequence of motions and or positions in a ride event.

The term "component" of an SMTD as used herein refers to a functional unit within the SMTD that is capable of an electronic activity such as detecting or measuring a physical parameter, receiving, storing, transmitting, computing, detecting acceleration, detecting speed, or switching. When in use an SMTD comprises or is in electrical connection with a power source such as a battery, hardwired electrical outlet, fuel cell, super capacitor, induction coil, generator, solar collector, self-winding mechanism, or other power supply.

The term "toggle" as used herein refers to activating or deactivating one or more functions on an SMTD.

The term "navigational circuit" as used herein refers to a circuit for a device according to the invention, in which the circuit is capable of determining relative position from a known starting point and internally acquired information, as for an inertial navigation system, or of receiving position input data from a user or from an external source such as a navigational beacon, and processing such information to calculate position to track the path of motion.

The term "navigation system" refers to a system for broadcasting geographic and or navigational position information from discrete sites or equipment.

The term "navigational beacon" as used herein refers to a navigational beacon such as a global positioning satellite, navigation ground stations for navigation broadcasts, and or marine navigation broadcast station. These terms refer to beacons from which an SMTD may receive transmitted position information. The term "externally obtained navigational information" refers to information transmitted from one of these beacons and received by an SMTD or by a source that transfers it to the SMTD.

The term "satellite" as used herein refers to a navigation satellite such as but not limited to a satellite in the constellation of the GPS system. The terms "ground station" and "aquatic station" as used herein refer to navigational broadcast stations that are based on land or a body of water, respectively.

The term "hand-held navigational device" as used herein refers to a position-finding device such as a consumer GPS device or comparable device.

The terms "geo-positioning satellite," "GPS," and "assisted GPS," as used herein have their ordinary and common meanings in the field of navigational technology and as used by consumers to refer to portable GPS devices.

The term "inertial navigational system" and "INS" as used herein are synonymous and have their ordinary and common meaning in the field of navigational technology. The term GPS-INS refers to a device or circuit that links or combines GPS and INS capabilities.

The term "central server" as used herein refers to a device that receives and sorts and or processes electronic information for distribution to a client. The central server may be a computer of a commercial luggage-tracking service, or may for instance be nothing more than a router or switchboard for sorting and relaying emails or wireless telephone calls.

The term "client" as used herein refers to a person who is tracking or monitoring a ride and receives or accesses information from a SMTD or by means a central server. The term client as used herein includes but is not limited to personal users, as well as professional users who employ the information for feedback on a ride, or for data mining of a marketing demographic.

The term "electronic communication" as used herein with respect to signals refers to the communication of information by means of electronic media. The term "directed electronic communication" refers to a message to a particular user as by a telephone call, email, instant messaging, text messaging, paging, or other electronic message to a particular user of the device according to the invention. The term "communications device" as used herein refers to a device for transmitting and or receiving directed electronic communications.

The term "in electrical communication" and like terms as used herein refer to the existence of a path for electrical current to flow between one referenced device component and another referenced device component.

The terms "radio frequency identification," "RFID," "dedicated short range communication," and "DSRC," as used herein are synonymous, and have their usual and ordinary meaning, i.e., they refer to electromagnetic or electrostatic coupling in the radio frequency portion of the electromagnetic spectrum to acquire or transmit identification information.

The terms "under the control of RFID" and like terms as used herein refer to toggling a circuit component on or off in response to an RFID signal, such as for activating or deactivating a detection component, navigational component, computational component, storage component, transmission component, or other component of a circuit for a SMTD device according to the invention.

The terms "telephone", "email", "text message" and "web page" as used herein have their respective normal and customary meanings. The term "client-accessible" as used herein with respect to a web page refers to publicly accessible web pages and also to web pages that are accessible to clients upon providing a security code.

The term "integrated system" as used herein with respect to the invention refers to a network of devices for receiving, processing and or reporting information in conjunction with an SMTD.

The term "g-force" as used herein refers to the acceleration of an object relative to free-fall. As is typical in the art, the unit of measure g (also G), where for a stationary object on earth 1 g is equivalent to standard gravity ($g_n$), 9.80665 meters per square second, an object has 0 g in a weightless environment such as free-fall or an orbiting satellite, and g-forces exceed 1 g on, for instance, accelerating rockets and roller coasters.

The term "altimeter" as used herein refers to an instrument for measuring altitude above a fixed level, generally sea level. It is to be understood that an altimeter measures altitude indirectly, based on atmospheric (i.e., barometric) pressure, thus its accuracy is weather-sensitive.

The term "speedometer" as used herein has its usual and ordinary meaning of a device that measures the instantaneous speed of a land vehicle or object. Where geo-positioning satellite information is used to calculate velocity herein, that will be indicated.

The term "odometer" as used herein has its usual and ordinary meaning and is synonymous with the colloquial terms mileometer or milometer: it indicates is a mechanical or electronic device for indicating distance traveled by an automobile or other vehicle.

The invention provides a mobile monitoring device for characterizing and evaluating the quality of a ride experience, based on velocity, g-forces, and vertical and lateral movement. The device is borne on the user's person, such as with a wrist strap, on a belt, or in a pocket or purse, or may be attached, e.g., to a ride vehicle. The device records changes in velocity and or g-forces, as well as periods of weightlessness, the length of time of the ride and altitude changes during the ride. Specifically, reported parameters optionally include but are not limited to data on speed (maximum and average), g-forces (most negative, most positive, and total), number loops or inversions, time of "ballistic" weightlessness, total distance traveled, altitude changes (maximum on a single loop, fastest single change, longest single change, and total changes), temperature, humidity and air pressure. Novel aspects of the invention include the portable device, its use in a particularized system network, the method for using the device, its use for characterizing noncompetitive and competitive rides.

The measurements are optionally done for an individual ride, displayed and stored on the device, and if desired, transmitted to a central server for storage and or dissemination. The device can thereby provide totals and maximum scores for each ride. The stored data may be used for personal record keeping, ranking rides relatively based on personal criteria, analyzing rides, and mining data about riders. Contemplated users for the device include but are not limited to users of roller coasters and other wild rides; users of passive airborne vehicles such as parachutes, hang gliders and hot air balloons; pilots; passengers in planes, trains, land vehicles, boats under sail and boats under power; drivers of off-road vehicles such as all-terrain vehicles, motocross bikes, dune buggies and snowmobiles; scuba and deep sea divers; businesses that rent out one or more of the vehicles above; and participants in both competitive and non-competitive sporting environments. Consumers have now become accustomed to a plethora of personal electronic devices, and chips for information processing and storage have become so small that considerable amounts of content may now be provided in a small device footprint.

In a particularly useful embodiment a device according to the invention is strapped to the wrist for easy visibility and programming during rides. Exemplary display features are below.

Examples of Physical Characteristics Recorded by the Self-Motion (SMTD) History Files Include the Following:

G-Forces
   Maximum g-force, in each direction
   Total time of weightlessness
   Maximum positive g-force and time
   Maximum negative g-force and time
   Centrifugal force
   Torque
   Ranking among enthusiasts
Velocity
   Maximum velocity achieved
   Average velocity
   Vertical velocity component
   Momentum
   Ranking among enthusiasts
Altitude
   Cumulative altitude change
   Maximum altitude change on single loop
   Maximum rate of altitude and time
   Ranking among enthusiasts
Angle
   Incline relative to the direction of motion
   Lateral angle
   Twist angle
   Angle relative to the ground
   Ranking among enthusiasts
Path
   Locations
   Distance traveled
   Loops and Related Features
   Ranking among enthusiasts Examples of User Inputs for the SMTD Include the Following:
   Reset for new ride
   Single ride history
   Accumulated ride histories
   Reset accumulated data to zero
   Time—real, ride time most recently, and ride times cumulative Examples of Qualifying Data Recorded by the SMTD Include the Following:
   Personal preferences, feedback and journaling on rides.
   Ranking among enthusiasts for maximum acceleration, velocity and altitude.

Examples of Other User Features for the SMTD Include the Following:
   Ride-themed games, trivia, information and communications for enthusiasts waiting for their next ride or relaxing at home.
   Schedules and hours of operation for themed parks.
   Sponsored content from ride proprietors and other parties, optionally including ads, promotions, and other marketing.

Devices according to the invention employ accelerometers optionally in combination with circuit elements such as altimeters for measurement, a GPS or e.g., GPS-INS circuit for path identification, a RFID device for owner recognition, and mobile phone technology for communicate with a central server. It will begin with a status indication such as a current position, velocity and acceleration; or may accept user inputs concerning one or more of those; or may work from a default value for the current position, velocity and or acceleration. For ride enthusiasts, g-force values are among the most important parameters, thus the basis for their measurement will be discussed first.

In devices according to the invention, one or more accelerometers are employed that are capable of measuring seatward (i.e., in the direction from a rider's head to the rider's seat) acceleration in the range of −5 to +10 g, more preferably −3 to +8 g, and still more preferably −2.5 to +6.5 g. In exemplary alternative embodiments, g-forces in the direction of the seat are measured in the range −2 to +6 g or −1.5 to +3 g.

In some embodiments of the invention, one or more accelerometers are employed that are capable of measuring forces in the direction of travel in the range of up to 10 g when braking (i.e., −10 g in the forward direction when braking), and up to 5 g while accelerating (i.e., +5 g in the forward direction while accelerating), more preferably up to 7 g when braking, and up to 3 g while accelerating, and still more preferably up to 5 g while breaking and up to 2 g while accelerating.

Furthermore, in some embodiments of the invention one or more accelerometers are employed that are capable of measuring up to 3 g in the lateral direction, more preferably up to 2.5 g in the lateral direction, and still more preferably up to 2.0 g. In some embodiments of the invention accelerometers are employed that are capable of measuring up to the range of 1.5 g through 1.8 g. Furthermore, in some embodiments of the invention accelerometers are employed that are capable of measuring up to 8 g, 7 g, 6 g, 5 g, 4 g, or 3 g in the direction of cornering.

Higher g-force ranges than those used for normal rides can also be used for the detection specifications. For instance they can toggle signaling in the event of the g force of accidental dropping, so as to send a phone message and enable immediate recovering of the device whenever there has been a single or bounced sharp g-force.

Relatively lower g-force detection ranges are desirable for gentler types of rides, such as parachuting. In one embodiment of the present invention the SMTD comprises an accelerometer that can detect a force that is in the range of 0.05 g to 10 g. In another embodiment the SMTD comprises an accelerometer that can detect a force that is in the range of 0.1 g to 5 g. In an additional embodiment the SMTD comprises an accelerometer that can detect a force that is in the range of 0.2 g to 3 g. In a particular embodiment the SMTD comprises an accelerometer that can detect a force that is in the range of 0.2 to 1.5 g. In a further embodiment the NSBD comprises an accelerometer that can detect a force that is in the range of 0.05 g to 0.5 g. In yet another embodiment the SMTD comprises an accelerometer that can detect a force that is in the range of 0.6 g. In still another embodiment the SMTD comprises an accelerometer that can detect a force that is in the range of 0.2 g. In yet another embodiment the SMTD comprises an accelerometer that can detect a force that exceeds 10 g, such as might be experienced in a vehicle accident. In a particular embodiment the SMTD comprises a plurality of accelerometers whose detection ranges are selected from one or more of these ranges.

In one embodiment of the present invention the SMTD comprises a history circuit that itself comprises an accelerometer. In a particular embodiment the SMTD comprises a history circuit that itself comprises one or more accelerometers that can detect a force that is in at least one of the ranges specified in the previous paragraph. In an additional embodiment the SMTD comprises a history circuit that can detect g-force profiles for starting and stopping of a vehicle. In yet another embodiment the SMTD comprises a history circuit electrically connected to a switch that can toggle the SMTD transmitter on or off. In a further embodiment the SMTD comprises a history circuit electrically connected to a switch for remote toggling on and or off of the SMTD transmitter, such that when the history circuit recognizes in-transit status the switch is prevented from toggling the transmitter off. In still another embodiment the SMTD comprises a history circuit electrically connected to a switch for remote toggling on and or off of the SMTD's transmitter, such that when the history circuit recognizes end-of-trip status the switch is allowed to toggle the SMTD's detection off. In an additional embodiment the SMTD comprises a history circuit electrically connected to a switch for remote toggling on and or off of the SMTD's transmitter, such that when the history circuit recognizes end-of-trip status the switch is allowed to toggle the SMTD's detection off in a time-delayed fashion. In yet another embodiment the SMTD comprises a history circuit electrically connected to a switch for remote toggling on and or off of the SMTD's transmitter, such that when the history circuit recognizes crossing into a specified geographically defined area the switch is allowed to toggle the SMTD's transmitter on or alternatively off, optionally in a time-delayed fashion.

It is to be understood that the forces measured by these various enumerated ranges for seatward, forward, lateral and cornering acceleration and deceleration include but are not limited to centrifugal force, and that centrifugal force can be calculated by ordinary algorithms and circuits based on measured or input speed, acceleration, direction of travel, and change in direction of travel.

These are not the only physical parameters of interest. Many rides include one or more features that spin, twist or twirl riders suddenly or at a high rate of speed, and riders are interested in the extremes they experience there. The rotational analogues of force, mass and acceleration are torque, moment of inertia, and angular acceleration, respectively; these terms are used herein with their usual and ordinary meanings from physics. The magnitude of the torque is the force (in foot-pounds or Newton-meters) magnified by rider's distance from the fulcrum and the sine of the angle (in radians) between the direction of force and the lever arm vector (i.e., the distance to the center of the rotation). This is alternatively expressed as a torque vector, which is the cross product of the lever arm vector (representing a rider's distance from the fulcrum of turning) and the force vector. The angular momentum is the torque multiplied by the duration of time for which it is applied; this is alternatively expressed as the cross product of the rider's linear momentum and its position vector relative to the fulcrum. Conveniently, knowing the g-forces for the torque can circumvent the need to ascertain mass in the momentum calculations. The energy of the motion is the torque multiplied by the angle of movement, in radians. The moment of inertia is the angular momentum divided by angular velocity. And the power is the torque multiplied by the angular velocity. Angular velocity is the rotational speed (in revolutions per minute, rpm) multiplied by $2\pi$, where $\pi$ is the universal constant 3.14159 . . . . The angular acceleration is the torque divided by the moment of inertia. By tracking the path of forces in different direction and their rates of change, the torque and other parameters can be determined in a manner analogous to triangulating one's position from multiple beacons. Also, angular accelerometers are commercially available, and inertial navigational systems based on such components are widely available.

In preferred embodiments, a device according to the invention employs one or more accelerometers that can detect forces in a range recited above for seatward, forward or lateral forces, wherein the range represents the magnitude measured for torque, angular momentum, moment of inertia, power, energy, or a related parameter.

As noted for the rotational phenomena, time is measured and used to calculate parameter magnitudes of interest. Internal chronometers, i.e., timekeeping circuits, are commonplace in electronic gauges. These have the additional benefit of the invention of enabling the device to create a chronological log of component incidents in the ride event, and to report such facts as the total time of weightlessness, amount of time at the ride's maximum positive g-force, amount of time at the ride's maximum negative g-force, and so forth. In addition, by measuring the profile of forces over time devices according to the invention can compute velocity for any point of interest in the ride, including maximum velocity, average velocity, fastest or longest drop and so forth.

In certain embodiments, devices according to the invention measure and or calculate one or more of the following: fulcrums for a force, inclines relative to the direction of motion, lateral angle of the ride, a rider's twist angles during the ride, and the rider's angle relative to the ground. The combination of force measurements, angular calculations and timekeeping function provide a basis for event history files when they are stored in sequential order. Thus by initiating a start function a user can begin the event recording session, audit the parameters in real time during the event, and optionally review it afterward or download the information, and optionally can erase the record to focus on creating the next one. In a particularly useful embodiment, a rider uses an SMTD according to the invention to name or rename a ride event, and to create, store and recall a plurality of files for respective individual rides on an SMTD, to compare ride events on the same day, different days, at different parks, or under a range of ride conditions.

Accelerometers

An accelerometer is a device for measuring reaction forces that are generated by acceleration and or gravity; accelerometers designed for measuring gravity alone are known as gravimeters. Accelerometers can be used to sense inclination, vibration, and shock. Both acceleration and gravity are typically measured in terms of g-force (m/s2), where 1 g=ca. 9.8 m/s2 (ca. 32 ft/s2). Single- and multi-axis models are available to detect magnitude and direction of the acceleration as a vector quantity. Under Einstein's equivalence principle the effects of gravity and acceleration are indistinguishable, thus acceleration can be measured alone only by subtracting local gravity from an accelerometer's output of raw data, otherwise an accelerometer at rest on the earth's surface will measure 1 g along the vertical axis. Horizontally, the device yields acceleration directly, but the device's output will zero during free fall in space (a relative vacuum), when the acceleration is identical to that of gravity. For a free fall in earth's atmosphere the device zeros only when terminal velocity (1 g) is reached, due to drag forces arising from air resistance. For inertial navigation systems, vertical corrections for gravity are usually made automatically, e.g., by calibrating the device while at rest. For the sake of reference, it is noted here that Formula One race car drivers usually experience 5 g while braking, 2 g while accelerating, and 4 to 6 g while cornering, and that most roller coasters do not much exceed 3 g but a few are twice that. As noted above, comfort ranges for rides extend to positive 6 g in the direction in which rider are seated, usually −1.5 to −2.0 g design limit for momentary weightlessness, and lateral g forces of up to the range of 1.5 g, though 1.8 g.

A typical automobile acceleration from 0 to 60 mph in 13 seconds represents a constant acceleration rate of about 0.20 g over a distance of no more than a few hundred feet. The following table illustrates g-force ranges that riders commonly experience in road vehicles.

| Automotive Acceleration (g) | | | | |
|---|---|---|---|---|
| | Vehicle: | | | |
| Event: | Typical Car | Sports Car | Formula 1 Race Car | Large Truck |
| Starting | 0.3 to 0.5 | >0.9 | 1.7 | <0.2 |
| Stopping | 0.8 to 1.0 | >1.3 | 2 | ca. 0.6 |
| Cornering | 0.6 to 1.0 | >2.5 | 3 | ca. 0.5 |

To put these into perspective, other acceleration events in the body tend to be larger, such as a sneeze (2.9 g), cough (3.5 g), jostling in a crowd (3.6), back slap (4.1 g), hopping off a step (8.1 g), casting oneself into a chair (10.1 g), or acceleration of the chest at 30 m.p.h. with an airbag (60 g). Crashes can produce body forces in the range of 70-100 g (high speed fatal crashes) or even 150-200 g (head acceleration during bicycle crash while wearing a helmet). Passenger airplane take-offs are at about 0.2 g, landings are in the range of 0.7 g to 1.5 g, and lateral acceleration rarely exceeds 0.2 g. The difference in g-forces between starting and stopping also provides one basis for accelerometric distinctions between the two events. Moreover, the number of g's is affected by location in a vehicle. For instance, cars may experience more g's at an axel because jarring by rough roads is not buffered by a shock absorber there. And boats have more g's at the top of a mast because the pitching motion pitching is greatest there.

In recent times accelerometers commonly have been very simple micro electro-mechanical systems MEMS. In a popular format they are little more than a cantilever beam with a proof mass (also called a seismic mass) and some type of deflection-sensing circuitry for analog or digital measurements. Under the influence of gravity or acceleration the proof mass deflects from its neutral position. Another type of MEMS-based accelerometer has a small heater at the bottom of a very small dome; the heater heats the air, which subsequently rises inside the dome. A thermocouple on the dome determines where the heated air migration to the dome and the deflection off the center is a measure of the acceleration applied to the sensor.

In a common application, accelerometers are used to calculate the degree of vehicle acceleration and deceleration. In an automobile that enables performance evaluation of both the engine/drive train and braking systems. Common ranges for that purpose include 0-60 mph, 60-0 mph and ¼ mile times, such as in wireless dashboard-mounted devices from Tazzo Motorsports and G-Tech. Accelerometers are also used in flight, for instance to detect apogee in rocketry. A 3-axis range of movement can be detected by using a digital accelerometer. This accelerometers detects movement in these three particular axis by sensing small voltage changes that occur in the accelerometer during movement in each of the three axis. A combination of three accelerometers, or two accelerometers and a gyroscope, are also used in aircraft inertial guidance systems. In an alternative an accelerometer in a spherical housing would swivel or "float" within a socket having a smooth and relatively frictionless inverse spherical interior for receiving the accelerometer, however the device will measure only acceleration in the direction(s) of force, unless the swiveling component's changes in orientation within the socket are tracked and correlated as by an electric eye or other sensor.

In more mundane commercial applications accelerometers have been used to measure vibration on vehicles, work machines, buildings, process control systems and safety installations. For instance, MEMS accelerometers are used in automotive airbag deployment systems; their widespread use in these systems has driven down the cost of such accelerometers dramatically. Accelerometers have also been used scientifically to measure seismic activity, inclination, machine vibration, dynamic distance and speed with or without the influence of gravity.

Recently accelerometers have also found use in enhanced measurements of user motion. For instance, accelerometers have been used in step counting (e.g., like a pedometer); thus Nike, Polar, Nokia and others have sold sports watches in which accelerometers help determine the speed and distance of a runner wearing such a watch. The Wii remote game console contains three accelerometers to sense three dimensions of movement and tilt to complement its pointer functionality, facilitating realistic interaction between a virtual avatar and manual movements of the user during sport-like games.

Recent developments also include the use of accelerometers in digital interface control. Since 2005 Apple's laptops have featured an accelerometer known as Sudden Motion Sensor to protect against hard disk crashes in the event of a shock. Smart phones and personal digital assistants (such as Apple's iPhone and iPod Touch and the Nokia N95) contain accelerometers for user interface control, e.g., switching between portrait and landscape modes, and for recognizing other tilting of the device. Nokia and Sony Erickson also employ accelerometers to detect tapping or shaking, for purposes of toggling features on a consumer electronic device. Examples of various types of accelerometers and some commercial sources for them are shown below. Single-axis, dual-axis, and triple-axis models exist to measure acceleration as a vector quantity or as just one or more of a vector's components. In addition, MEMS accelerometers are available in a wide variety of measuring ranges, even to thousands of g's.

The following list of accelerometer types includes representative designs and sources for accelerometer devices.

Accelerometer data logger—Reference LLC
    Bulk Micromachined Capacitive—VTI Technologies, Colibrys
    Bulk Micromachined Piezo Resistive
    Capacitive Spring Mass Based—Rieker Inc
    DC Response—PCB Piezotronics
    Electromechanical Servo (Servo Force Balance)
    High Gravity—Connection Technology Center
    High Temperature—PCB Piezotronics, Connection Technology Center
    Laser accelerometer
    4-20 mA Loop Power—PCB Piezotronics, Connection Technology Center
    Low Frequency—PCB Piezotronics, Connection Technology Center
    Magnetic induction Modally Tuned Impact Hammers—PCB Piezotronics, IMI Sensors
Null-balance
Optical
Pendulating Integrating Gyroscopic Accelerometer (PIGA).
Piezo-film or piezoelectric sensor—PCB Piezotronics, IMI Sensors
Resonance
Seat Pad Accelerometers—PCB Piezotronics, Larson Davis
Shear Mode Accelerometer—PCB Piezotronics, IMI Sensors, Connection Technology Center
Strain gauge—PCB Piezotronics
Surface acoustic wave (SAW)
Surface Micromachined Capacitive (MEMS)—Analog Devices, Freescale, Honeywell,
PCB Piezotronics, Systron Donner Inertial (BEI)
Thermal (submicrometer CMOS process)—MEMSIC
Triaxial—PCB Piezotronics, Connection Technology Center Additional sources of suitable acceleration switches for use with the present device include the following: Select Controls, Inc. (Bohemia, N.Y.); Inertia Switch, Inc. (Orangeburg, N.Y.); Aerodyne Controls, A Circor International Company (Ronkonkoma, N.Y.); Honeywell Sensing and Control (Golden Valley, Minn.); Measurement Specialties, Inc. (Hampton, Va.); Masline Electronics, Inc. (Rochester, N.Y.); Allied International (Bedford Hills, N.Y.); Jo-Kell, Inc. (Chesapeake, Va.); D'Ambrogi Co. (Dallas, Tex.); Impact Register, Inc. (Largo, Fla.); Hubbell Industrial Controls, Inc. (Archdale, N.C.); Comus International (Clifton, N.J.); and Milli-Switch Corp. (Bridgeport, Pa.).

Inertial Navigation Systems

Methods by which accelerometers are used to track direction and angle include their use in an inertial navigation system (INS). The INS employs a computer and motion sensors—particularly a combination of accelerometers and optionally a device such as gyroscope—to continuously track the position, orientation, and velocity (direction and speed of movement) of a vehicle without the need for external references. Other names for these and related devices include inertial guidance system, inertial reference platform, and similar appellations. The initial position and velocity is provided from another source such as a human operator, GPS satellite receiver, etc., and thereafter computes its own updated position and velocity based on data from its motion sensors. The advantage of an INS is that it requires no external references when determining its position, orientation, or velocity after receiving the initial external data. Unlike navigation systems that rely on external radiofrequency beacons, it is immune to jamming or accidental radio interference. It can also continue to recognize its own location even when radio contact is broken off, such as inside a canyon, an enclosed or partially indoor roller coaster ride or an airport terminal.

An INS can detect a change in its velocity, orientation (rotation about an axis) and geographic direction (vector) by measuring the linear and angular accelerations. The orientation is determined by gyroscopes, which measure the angular velocity of the system in the inertial reference frame much as a passenger can feel the tilt of a plane in flight. Accelerometers measure the linear acceleration of the system in the inertial reference frame, but only in directions that can be measured relative to the moving system, much as passengers may experience pressure forcing them into their seats during take-off. By tracking a combination of the linear and angular acceleration, the change relative to the inertial reference frame may be calculated. Integrating the inertial accelerations with the original velocity as the initial condition in appropriate kinematic equations yields the inertial velocities of the system. Integrating again with the original position as the initial condition yields the inertial position. INS was originally developed for rockets and employed rudimentary gyroscopes, but today is commonly used in commercial aircraft and other transportation vehicles.

All INSs suffer from integration drift that arises from the aggregation of small errors in measurement that is inherent in every open loop control system. The inaccuracy of a high-quality INS is normally less than 0.6 nautical mph in position, tenths of a degree per hour in orientation. Output errors may be an order of magnitude greater for INS alone than for GPS alone. Combining INS output data with output data from another navigation system such as a GPS system can minimize and stabilize drift in position and velocity computations for either or both systems. The location determined by a GPS system can be updated every half-minute, thus when GPS signal is accessible a logic circuit can essentially eliminates the drift arising from INS. In complementary fashion, the INS provides ongoing position information when the observer is in a location where GPS signals cannot be received. The inertial system provides short-term data, while the satellite system corrects accumulated errors of the inertial system. In fact, INS is now usually combined with satellite navigation systems through a digital filtering system, such as by utilizing control theory or Kalman filtering. The INS can also be re-calibrated during terrestrial use by holding it at a fixed location at zero velocity.

INSs have both angular and linear accelerometers for changes in position; some include a gyroscopic element for maintaining an absolute angular reference. Angular accelerometers measure how the vehicle is rotating in space. Using aircraft guidance systems as an example, generally, there is at least one sensor for each of the three axes: pitch (nose up and down), yaw (nose left and right) and roll (clockwise or counter-clockwise from the cockpit). There is typically a linear accelerometers to measure motion in space along each of three axes (vertical, lateral, and direction of travel). A computer continually updates the vehicle's current position. First, for each of the six degrees of freedom (x, y, z, θx, θy, and θz), it integrates the sensed amount of acceleration over time to compute the current velocity. Then it integrates the velocity to compute the current position. In addition, an inertial guidance system that will operate near the earth's surface must incorporate Schuler tuning so its platform will continue pointing towards the earth's center during movement of the vessel.

The relative cost and complexity of INS designs affect the choice of which systems are most practical for use in the current invention, however with the ongoing deflation of prices for electronic devices various INS designs are increasingly practical and some are already within an appropriate range. Illustrative examples of INS systems in the current art that are technically suitable for use with the invention include the following.

Gimballed gyrostabilized platforms have linear accelerometers on a gimbaled gyrostabilized platform. The gimbals are a set of three rings, each with a pair of bearings initially at right angles to let the platform twist about any rotational axis. Usually the platform has two gyroscopes at right angles so as to cancel gyroscopic precession, the tendency of a gyroscope to twist at right angles to an input force. This system allows a vehicle's roll, pitch, and yaw angles to be measured directly at the bearings of the gimbals. Relatively simple electronic circuits can be used to add up the linear accelerations, because the directions of the linear accelerometers do not change. Expense, wear, potential to jam (mechanically), and gimbal lock are among the drawbacks of these systems.

Fluid-suspended gyrostabilized platforms use fluid (i.e., helium or oil) bearings or a flotation chamber to mount a gyrostabilized platform, usually there are four bearing pads in a tetrahedral arrangement in spherical shell. These systems can have very high precisions (e.g. Advanced Inertial Reference Sphere), and like all gyrostabilized platforms, they run well with relatively slow, low-power computers. Low end systems use bar codes to sense orientation, and may be powered by a solar cell or single transformer. High-end systems employ angular sensors composed of a strip of transformer coils on a printed circuit board, in combination with transformers outside the sphere, to measure (induction-based) changes in magnetic field associated with movement.

Strapdown systems have sensors strapped to the vehicle, which eliminates gimbal lock, removes the need for some calibrations, minimizes the computing hardware requirements, and increases the reliability by eliminating some of the moving parts. Angular rate sensors called "rate gyros" are employed. Whereas gimballed systems could usually do well with update rates of 50 to 60 updates per second, strapdown systems normally update about 2000 times per second in order to keep the maximum angular measurement within a practical range for real rate gyros: about 4 milliradians. Most rate gyros are now laser interferometers. Maintaining precision in the updating algorithms ("direction cosines" or "quaternions") requires digital electronics, but such computers are now so inexpensive and fast that rate gyro systems are in practical use and mass-produced.

Motion-based alignment infers orientation from position history, as in GPS for cars and aircraft, where the velocity vector usually implies the orientation of the vehicle body. Honeywell's Align in Motion (Doug Weed, et al., "GPS Align in Motion of Civilian Strapdown INS," Honeywell Commercial Aviation Products) is an FAA-certified process in which the initialization occurs while the aircraft is moving, in the air or on the ground; it uses GPS and an inertial reasonableness test (allowing commercial data integrity requirements to be met) and recovers pure INS performance equivalent to stationary align procedures for civilian flight times up to 18 hours. It avoids the need for gyroscope batteries on aircraft.

Vibrating gyros are used in inexpensive navigation systems as for automobiles, may use a vibrating structure gyroscope to detect changes in heading, and the odometer pickup to measure distance covered along the vehicle's track. This type of system is much less accurate than a higher-end INS, but is adequate for typical automobile applications in which GPS is the primary navigation system, and dead reckoning is needed only to fill gaps in GPS coverage when buildings or terrain block the satellite signals.

Hemispherical Resonator Gyros (HRG or "Brandy Snifter Gyros") employ a standing wave induced in a hollow globular resonant cavity (i.e. something like a brandy snifter); composed of piezoelectric materials such as quarts; when the cavity is tilted the waves tend to continue oscillating in the original plane of motion, thereby allowing measurement of the angle between the original and turned plane of motion. The electrodes to start and sense the waves are evaporated directly onto the quartz. This system has almost no moving parts, and is very accurate, though at present the cost of the precision ground and polished hollow quartz spheres limits the scope of practical use. The classic system is the Delco 130Y HRG, developed about 1986.

Quartz rate sensors are usually integrated on silicon chips. Each of these sensors has two mass-balanced quartz tuning forks, arranged "handle-to-handle" so forces cancel. Aluminum electrodes evaporated onto the forks and the underlying chip both drive and sense the motion. The system is inexpensive, and the dimensional stability of quarts makes the system accurate. As the forks are twisted about the axis of the handle, the tines' vibration tends to continue in the same plane of motion, which is resisted by electrostatic forces from electrodes under the tines. By measuring the difference in capacitance between the two tines of a fork, the system determines the rate of angular motion. Current non-military versions include small solid state sensors that can measure human body movements; they have no moving parts, and weigh about 50 grams. Solid state devices such as these are used to stabilize images taken with small cameras or camcorders, can be extremely small (5 mm) and are built with MEMS (Microelectromechanical Systems) technologies.

Magnetohydrodynamic (MHD) sensors are used to measure angular velocities; their accuracy improves with the size of the sensor.

Laser gyros eliminate the bearings in gyroscopes, and thus avoid most disadvantages of precision machining and moving parts. A laser gyro splits a beam of laser light into two beams in opposite directions through narrow channels in a closed optical circular path around the perimeter of a triangular block of temperature-stable cervit glass block with reflecting mirrors placed in each corner. When the gyro rotates at some angular rate, the distance traveled by each beam becomes different—the shorter path being opposite to the rotation. The phase shift between the two beams is measured by an interferometer, and is proportional to the rate of rotation (the Sagnac effect). In practice, at low rotation rates the output frequency can drop to zero (i.e., no interference detected) after the result of "back scattering," causing the beams to synchronize and lock together, which is known as a "lock-in", or "laser-lock." To unlock counter-rotating light beams, laser gyros either have independent light paths for the two directions (usually in fiber optic gyros), or the laser gyro is mounted on a piezo-electric dither motor that rapidly vibrates the ring back and forth about its input axis through the lock-in region to decouple the waves. The shaker design is accurate because both light beams use exactly the same path, but does contain moving parts though they do not move far.

Pendular accelerometers have a mass which can move only in-line with a spring to which it is attached. For an open-loop system, acceleration along the axis of the spring causes a mass to deflect in the other direction, and the offset distance is measured. The acceleration is derived from the values of deflection distance, mass, and spring constant. The system must also be damped to avoid oscillation. A closed-loop accelerometer achieves higher performance by using a feedback loop to cancel the deflection, thus keeping the mass nearly stationary. Whenever the closed-loop mass deflects, the feedback loop causes an electric coil to apply an equally negative force on the mass, canceling the motion and greatly reducing the non-linearities of the spring and damping system. Acceleration is derived from the amount of negative force applied. In addition, this accelerometer provides for increased bandwidth past the natural frequency of the sensing element. Both types of accelerometers have been manufactured as integrated micromachines on silicon chips.

Commercial sources for inertial navigation systems and or their components include the following.

AeroSpy Sense & Avoid Technology GmbH, Austria

Applanix—A Trimble Company, Canada

Crossbow Technology Inc., USA

Dewetron, Austria
Deutsche Montan Technologie GmbH, Germany
Flexit, Sweden—borehole positioning systems.
Honeywell Inc., USA
IGI, Germany
iMAR Navigation GmbH, Germany—European solutions for global industrial and defense applications with all types of inertial sensor technology
InterSense, USA—miniature inertial sensors and hybrid tracking systems.
iXSea, France
Kearfott Guidance & Navigation Corporation, USA
Kongsberg Maritime, Norway
Microbotics Inc, USA—GPS-Aided INS
MicroStrain—inclinometers and orientation sensors
Nec-Tokin, Japan—miniature ceramic sensors
Navigation Systems index Northrop Grumman, USA
Litef, Germany (a division of Northrop Grumman, USA)
Northrop Grumman Italia, Italy (a division of Northrop Grumman, USA)
Sperry Marine (a division of Northrop Grumman, USA)
Sagem, France
SEG, Germany
Systron Donner Inertial, USA (owned by Schneider Electric)
TUBITAK—SAGE, Turkey—Integrated Inertial Navigation Systems
Technaid, Spain—Inertial Measurement Systems
TRX Systems, Inc—Integrated Inertial Navigation Systems
U.S. Dynamics Corporation, USA
Verhaert, Belgium
Xsens, Netherlands—miniature solid state sensors
Invensense—silicon chip sensors In a particular embodiment of a device according to the invention, the SMTD employs an inertial navigation system, by which it determines path parameters for a ride such as velocities, acceleration, circuits and loops taken, distances, and the like.

Altimeters

The height of a ride is of interest particularly for rides that climb several hundred feet or more. The indirect measurements common for altitude cause absolute errors that depend on the geographic region and time, but for relative measurements in a space of less than a square mile or two over the course of a few minutes, the precision is more than sufficient.

A pressure altimeter (also known as a barometric altimeter) is the altimeter most commonly used. In it, an aneroid barometer measures the atmospheric pressure from a static port outside the point of reference. Air pressure decreases with an increase of altitude—approximately 100 millibars per 800 meters or one inch of mercury per 1000 feet near sea level. The altimeter is calibrated to show the pressure directly as an altitude above mean sea level, based on a mathematical model defined by the International Standard Atmosphere (ISA).

The imprecision arises because atmospheric pressure changes as the weather does. It is not unusual for air pressure to change by 1 mbar due to temperature change alone. This 1 mbar change in pressure could result in a skewed altitude reading of up to 26 feet (8 meters). On a day with very substantial weather changes, as with an approaching cold front, air pressure could change by as much as 5 mbar or more and result in a skewed altitude reading of up to 130 feet (40 meters) or more. Typically as bad weather approaches the ambient air pressure falls, and is interpreted by the altimeter as an increase in altitude. The opposite is true when weather improves. To compensate, an altimeter must be calibrated using a known altitude or a known pressure value, e.g., at a specific landmark or at a specific ride. If the specific altitude is unknown, a known pressure value will suffice. Typically a barometric pressure value is used for calibration, measuring current air pressure at sea level for a specific location. Official barometric pressure reports are updated several times per day, and can usually be obtained from various weather information sources, and can be specific for each ride.

In certain embodiments of devices according to the invention, the device employs an altimeter. In some embodiments, the device records the largest single altitude change on the ride. In additional embodiments, the device records the longest or fastest drop or rise. In yet another embodiment, the device records the maximum altitude change on a single loop of the ride. In a further embodiment, the device accepts user inputs to calibrate the altimeter. In still further embodiments, the device accepts user inputs ranking altitude components of a ride.

Navigation Guidance Systems

Global Positioning Satellite (GPS) and similar small electronic receivers are capable of assessing speed based on change in position between measurements (usually taken at one-second intervals). As the GPS is a triangulation system, its speed calculations depend on the positional accuracy and beacon signal quality. Speed calculations are more accurate at higher speeds, when the ratio of positional error to positional change is lower. GPS software may also use a moving average calculation to reduce error. An advanced Global Positioning Satellite (GPS) receiver (GPSr) with an odometer mode serves as a very accurate pedometer for outdoor activities. While not truly counting steps (no pendulum is involved) an advanced GPSr odometer can reveal the accurate distance traveled to within $\frac{1}{100}$th of a mile (depending on the model, even $\frac{1}{1000}$th of a mile), or approximately the distance of two steps. A GPSr with odometer mode is also an excellent and inexpensive means to track speeds on rides that last more than a few seconds.

GPS units are typical of navigational system user hardware, as usual, the receiver includes the following:
 an antenna;
 receiver-processors;
 a highly stable clock such as a crystal oscillator;
 optionally an information display for the user;
 between 12 and 20 channels in contemporary models, corresponding to the number of satellites that they can monitor simultaneously;
 optionally an input for differential locations, such as the RTCM SC-104 format, internal DGPS format, or Wide Area Augmentation System Receiver;
 hardware for relaying position data to a PC or other device, such as by the US-based National Marine Electronics Association (NMEA) 0183 or 2000 protocol, or such as the SiRF or MTK protocol; and
 optionally an interface for other device such as a serial connection, USB or Bluetooth.

GPS receivers are small enough to fit into phones and watches, and for instance a SiRF-star III receiver and integrated antenna from the Antenova company (UK) has dimensions 49×9×4 mm, which is about the size of a small, wafer-thin computer keyboard.

GPS and similar devices rely on navigation guidance systems, broadly known as the global navigation satellite system (GNSS), for systems having autonomous geo-spatial positioning with global coverage. Stationary ground receivers can also be used to calculate precise time. The U.S. NAVSTAR Global Positioning System (GPS) was the first fully functional operational GNSS, based on 31 Medium Earth Orbit satellites (about 20,200 km above the earth) in non-uniform orbits; each satellite transmits precise microwave signals, and at least six satellites are within the line of sight for almost every place on the earth's surface. Other systems are in development, including the Russian GLONASS and the European Union's Galileo. Regional satellite navigation systems include China's Beidou navigation system titled "Compass" based on 30 Medium Earth Orbit satellites and five geostationary satellites, India's IRNSS under development and Japan's QZSS system.

GNSS-1 is the first generation and includes satellite- and ground-based augmentation (SBAS and GBAS, respectively) such as the Wide Area Augmentation System (WAAS, U.S.), European Geostationary Navigation Overlay System (EGNOS), Multi-Functional Satellite Augmentation System (MSAS, Japan) and GAGAN (India). GBAS examples include the Local Area Augmentation System (LAAS), regional CORS networks, Australian GRAS, and U.S. Department of Transportation National Differential GPS (DGPS) service, as well as local GBAS using single GPS reference station Real Time Kinematic (RTK) corrections. GNSS-2 is for independent civilian navigation (e.g., Galileo, Europe): L1 and L2 frequencies are for civil use and L5 for system integrity; it will adopt the same frequency assignments as GPS.

Each GNSS satellite transmits its position in a data message superimposed on a code that serves as a timing reference, and an atomic clock synchronizes timing for all satellites in a network. The signal's time-of-flight is calculated by subtracting encoded transmission time from reception time. When several such measurements are made at the same time relative to different satellites, the GNSS allows determination of a continual fix on position in real time, essentially by triangulation. For fast-moving receivers the change in distance and reception angle affects calculations. The computation seeks the shortest directed line tangent to four oblate spherical shells centered on four satellites. Combining signals from more satellites and correlators reduces error; methods such as Kalman filtering provide a single estimate for position, time, and velocity. The calculated location is then translated into a specific coordinate system such as latitude/longitude using the WGS 84 geodetic datum or a country-specific system.

Each GPS satellite continuously broadcasts a navigation message at 50 bit/s, in 30-second frames of 1500 bits each; the code is unique to each satellite so all can use the same frequency. The opening (6 seconds) provides time of day, GPS week number and satellite health data; the second part (12 more seconds) is an ephemeris with the satellite's precise orbit, updated every 2 hours and generally valid for twice that; and the closing is an almanac (12 seconds: coarse orbit and status data for each satellite in the constellation) but the almanac is only provided in increments of $1/25$, so 12.5 minutes are required to receive the entire almanac. The almanac standardizes time, corrects for ionosphere error, and facilitates receiver focus on visible satellites, though that is less necessary in newer GPS hardware. Satellites are designated unhealthy when their orbits are being corrected, then designated healthy again.

Errors arise from several sources. Ionospheric effects introduce ±5-meter error. Ephemeris effects introduce ±2.5-meter error. Satellite clock errors effects introduce ±2-meter error. Multipath distortion introduces ±1-meter error, as do numerical errors. Tropospheric effects introduce ±0.5-meter error. Relativity, Sagnac distortion, and other sources can also cause small errors. Autonomous civilian GPS horizontal position fixes are accurate to about 15 meters (50 feet); high frequency P(Y) signal results are accurate to about 1.5 meters (5 feet). A currently disabled feature in GPS, Selective Availability (SA), introduced random errors of up to 10 meters horizontally and 30 meters vertically in C/A. Interference from solar flares, windshield metal, malfunctioning television preamplifier, etc., can also cause errors or weaken signals. Some errors are minimized by resolving uncertainty in signal phase differences, as in Carrier-Phase Enhancement (CPGPS). Another approach resolves cycle numbers in which signal is transmitted and received, using differential GPS (DGPS) correction data, as in Relative Kinematic Positioning (RKP) statistically with Real-Time Kinematic Positioning (RTKP).

GNSS Augmentation incorporates external information to improve accuracy, availability, or reliability of satellite broadcasts. Some systems correct for error sources such as clock drift, ephemeris, or ionospheric delay. Others measure the signal's error history. Still others provide supplemental navigational or vehicle data. Augmentation systems include the WAAS, EGNOS, MSAS, Differential GPS, and Inertial Navigational Systems.

Assisted GPS (A-GPS or aGPS) was introduced to enhance conventional GPS for cell phones; and expedited under the U.S. Federal Commerce Commission's E911 mandate to make cell phone positions available to emergency call dispatchers. It addresses problems with weak reception, signal reflection, multipath echo effects, and barriers to signal. Powering up in unfavorable conditions, some non-A-GPS units require up to a minute of clear signal to download the almanac and ephemeris information from GPS satellites.

A-GPS receivers locate a phone approximately in its cellular network using an Assistance Server to compare fragmentary cell signals with direct satellite signal; they supply orbital data for GPS satellites to a cell phone to enable locking on to the satellite signal, and provide more complete data about ionospheric conditions than the phone contains. Some but not all A-GPS solutions require active connection to a communications network. Because the assistance server does so much computation, CPU and programming requirements in A-GPS phones can be small.

High Sensitivity GPS is similar to A-GPS, addressing some of the same issues that do not require additional infrastructure, except that it cannot provide instant fixes on satellite positions when the phone has been off for some time.

Enhanced GPS (or eGPS) compares favorably with A-GPS, and was developed by CSR and Motorola for an open industry forum for mobile phones, exploiting cellular network data on GSM/W-CDMA networks. It provides faster location fixes, better reception, lower cost and lower power and processing requirements. E-GPS combines CSR's "Matrix" technology to locate the user instantly to 100 meter accuracy based on cell tower information. CSR's "Fine Time Aiding" then guides the device search for a GPS signal, to acquire satellite data within seconds. This is said to be equivalent to 6 dB more sensitivity than achieved by any GPS hardware correlator in the terminal. Other GPS uses for monitoring moving carriers include the following.

U.S. Pat. App. Pub. No. 2006/0161345 A1 to Mishima et al. claims a vehicle load control system in which information on the cargo loading condition of a moving vehicle is combined with position information from a GPS and is communicated to a control center.

U.S. Pat. App. Pub. No. 2005/0197755 A1 to Knowlton et al. discloses a method to determine the position and orientation of work machines such as excavators, shovels and backhoes by two- and three-dimensional GPS in combination with inertial sensors to calculate pitch and roll from linear accelerations.

Laid-Open German Pat. App. Pub. No. DE 199 38 951 A1 to Trinkel (Deutsche Telekom AG) discloses a vehicle-finding device, depicted in the form of a casing for the head of a car key, which includes a GPS receiver and an antenna for the same, a device for computing the direction and or distance to the vehicle, and a device for acoustic, optical and or sensor-motor output especially of the direction and or distance.

In one embodiment of the present invention the SMTD receives navigational information from any of the above-described current navigational guidance systems. In a further embodiment of the invention the SMTD receives navigational information from a GNSS. In a particular embodiment of the invention the SMTD receives navigational information from a GNSS-1 system. In another embodiment of the invention the SMTD receives navigational information from a GNSS-2 system. In yet another embodiment of the invention the SMTD receives navigational information from a ground-based station. In still another embodiment of the invention the SMTD receives navigational information from an aquatic-based station. In a further embodiment of the invention the SMTD receives navigational data from a GPS satellite. In another embodiment the SMTD receives navigational data from an A-GPS transmitter.

In a further embodiment the SMTD tracks and reports one or more path parameters such as locations of the rider, the distance traveled, loops and related features in the path as determined by means of a navigational circuit in the SMTD.

RFID Features

RFID (radio frequency identification), also known as dedicated short range communication (DSRC), employs electromagnetic or electrostatic coupling in the radio frequency (RF) portion of the electromagnetic spectrum to acquire or transmit unique identification information, which in the past has generally concerned an object, animal, or person. RFID is a popular commercial alternative to bar codes because it does not require direct contact or line-of-sight scanning. The error rate for RFID scanners is only about 0.5%, significantly less than the scanning errors that arise from line-of-sight reading for bar codes.

An RFID system consists of three components: an antenna and transceiver (often combined within one reader) and a transponder (the tag). RF signals transmitted from the antenna activate the transponder tag, which then transmits data back to the antenna. The data instructs a programmable logic controller to conduct some action which could be a mechanical motion or could be interfacing with a database for a transaction or data release. Low-frequency RFID systems (30 KHz to 500 KHz) have short transmission ranges (usually <6 six feet). High-frequency RFID technology (850 MHz to 950 MHz and 2.4 GHz to 2.5 GHz) has longer ranges (more than 90 feet). Higher frequency systems tend to have higher costs.

In an illustrative embodiment using RFID, SMTDs according to the present invention comprise a receiver for RFID labels. In one embodiment the SMTD's read electronic data from a RFID transmitter posted at the gate of a commercial ride in order to name files, set default values, and program for ride features of special interest. In another embodiment, a signal transmitted via RFID toggles the SMTD motion detection mode on at the entrance gate for a ride or off at the exit gate for a ride.

Transmitting and Reporting

The SMTD may not only receive but also transmit by any medium and frequency that is practicable for wireless communication, including by telephony, short wave radio, digital or analog signal, marine band, or other remote telecommunication medium. For transmitting to a central server a telephonic or paging signal is particularly useful. Communications between a client and central server may conveniently employ any practicable medium, wireless or otherwise. This may include telephone calls, wireless text messages, email, postings to a website, and other media.

In one embodiment of transmission and reporting, when the SMTD comes within 32 foot range of a Bluetooth™ device there is "connection made" allowing automatic notification of the client. In this embodiment, when the SMTD is "ACTIVE/ON" in that range of distance, the user will be able to detect its presence via software applications run to "watch" for the appropriately "named Bluetooth™ device". The SMTD will then contact the central server and or the client through the Bluetooth™ device Bluetooth™ is a wireless communication protocol that uses short range radiofrequency transmissions to connect and synchronous fixed and or mobile electronic devices into wireless personal area networks (PANs), yet with low power consumption. Its specification is based on frequency-hopping spread spectrum technology. The Bluetooth™ specifications are developed and licensed by the Bluetooth™ Special Interest Group (SIG), and involve transceiver microchips in each of the communicating devices. The Bluetooth™ SIG consists of companies in the areas of telecommunication, computing, networking, and consumer electronics. Most Bluetooth™ devices have unique addresses, unique names, can be configured to advertise their presence. Connectable devices for Bluetooth™ include mobile and other telephones, laptops, personal computers, printers, GPS receivers, digital cameras, Blackberry™ devices and video game consoles over a secure, globally unlicensed Industrial, Scientific and Medical (ISM) 2.4 GHz short-range radiofrequency bandwidth. Bluetooth™ is supported on Microsoft™, Mac™, Linux and other platforms Under current Bluetooth™ technology Class III (1 mW (0 dBm) devices have a range of 3.2 feet (or 1 meter); Class II 2.5 mW (4 dBm) devices (i.e. most bluetooth cell phones, headsets and computer peripherals) have a range of 32 feet (or 10 meters); and Class I (100 mW, 20 dBm) devices have a range up to 100 meters. In most cases the effective range of class 2 devices is extended if they connect to a class 1 transceiver, compared to pure class 2 network. This is due to the higher sensitivity and transmission power of Class 1 devices. The transmissions can be farther; Class 2 Bluetooth radios have been extended to 1.78 km (1.08 mile) with directional antennas and signal amplifiers. Transmissions also do not need to be within the line of sight, and if the signal is strong enough can penetrate a wall.

Current data transmission rates are in the range of 1 Mbit/s (version 1.2) or 3 Mbit/s (Version 2.0+EDR), but under improvements proposed by the WiMedia Alliance would increase to 53 to 480 Mbit/s. Currently Wi-Fi technology provides higher throughput and covers greater distances, but requires more expensive hardware and higher power consumption, however unlike Wi-Fi, which is an Ethernet, the Bluetooth™ devices are like a wireless FireWire and can replace more than local area networks and even surpass the universality of USB devices. Bluetooth™ also does not require network addresses or secure permissions, unlike many other networks. Despite discussion in recent years of the possibility of viruses and worms through Bluetooth™, at this time no major worm or virus has yet materialized, possibly because 10,000 companies in the telecommunications, computing, automotive, music, apparel, industrial automation, and network industries and other companies in the SIG are using and improving the devices and sharing their work on the security measures with each other.

Programming

Illustrative user inputs for the SMTD include the following: Reset for new ride; Single ride history; Accumulated ride histories; Reset accumulated data to zero; Time—real, ride time most recently, and ride times cumulative. In one embodiment the SMTD is set to "START" prior each ride by the user, central server or in the case of a roller coaster by a locally placed RFID device. This allows the device to gauge its starting altitude; and use that altitude as a reference point for the remainder of its altitude measurements on the ride. The device may recognize the specific characteristics of the ride by the code of the RFID or by receiving a signal from the server or ride purveyor. Alternatively the SMTD vendor may pre-program the device with statistics from each ride of a given amusement park.

The following illustrative embodiments exemplify various embodiments of the invention as described, but the invention is not so limited.

EXAMPLE 1

In a particular embodiment, an illustrative flow chart of information processing suitable for the SMTD in depicted in FIG. 1. The tracking function is initiated by a START function, which may be in the form of a user re-set, vendor re-set (as where a park remotely resets its own or rider SMTDs on a ride), or by passing in the vicinity of a RFID device that initiates the START function. In this embodiment, the ALTITUDE function is activated, and informed by data from the vendor or its RFID device. The HEIGHT, SPEED, and PATH data cells are populated by the user, by internal detection, or by the RFID device. Having acquired the initial inputs, the SMTD autonomously activates its START function for the tracking features and for creating a history file.

The tracking then follows with measurements taken. In this depicted embodiment these include in a first task, assessing g-forces and compiling a list of maximum forces and total exposure time, weightlessness, positive g-forces, and negative g-forces. In a second task, velocity is assessed: maximum and mean values. In a third task, distance is assessed; for this embodiment the total maximum length for a single loop is determined. In a fourth task, altitude is assessed: total altitude change is determined, and the maximum height of a single loop is determined.

The tracking and timing is then ended by the STOP function, either by a user input or autonomously. A display of the physical parameters is presented either continuously, on demand, or autonomously after a STOP command. Both the individual extremes for points along the ride and the cumulative values for the ride are displayed. Optionally the data is simultaneously or subsequently routed to the vendor (the ride's purveyor), where logging in by the user allows ranking and statistical scores by either the rider or the vendor.

EXAMPLE 2

FIG. 2 depicts an illustrative transmission arrangement for the SMTD. There broadcast information from navigational stations in space, on land or on water are received, from which—if its circuit is so configured or programmed—the SMTD may optionally compute its own coordinates and timing. The central server shown in FIG. 2 is optionally operated by a vendor who tracks riders or vehicles; in that case the server may calculate position, time and speeds, but an appropriate central server may in fact be nothing more than a router or switchboard for sorting and relaying emails or wireless telephone calls. The data received at the server is redirected to a client, optionally in a further processed form.

Optionally, when the SMTD is "ACTIVE/ON" and within 32 feet of the user/owner of a Bluetooth™ device; the user will be able to detect its presence via software applications that "watch" for the appropriately "named Bluetooth™ device", and will then be able to communicate with either the server or the SMTD to establish a location. Alternatively, instead of or in addition to the SMTD establishing communications through a Bluetooth™-facilitated personal area network, the client or central server may do so, for instance by means of a cell phone or laptop device in which a microchip provides Bluetooth™ functionality.

EXAMPLE 3

FIG. 3 depicts an illustrative embodiment of communication flows in a system for monitoring ride performance. In this particular embodiment, transmissions of coordinates and timing from a navigational station are received at a SMTD device according to the invention, which is in close association with a rider or ride vehicle. The SMTD optionally then computes and stores its own coordinates and timing data. Also in this particular embodiment, the SMTD has an automatic function under the control of RFID, an accelerometer or history circuit. Non-exclusive illustrative useful functions that may be under such control include: displaying new data to the rider, such as upon attaining thresholds of speed, g-force, and height; and transmitting data to a central server, such as when a history file is completed at the end of a ride. Following release for display or transfer, the data is transmitted optionally via Bluetooth™ technology to either a central server, where upon reception the coordinates, timing, speed, accelerations, torque, or other physical parameters are optionally computed and stored. The central server then transmits the data to a client. In an alternative embodiment the data is transmitted from the SMTD in parallel or in the alternative directly to a client. As shown in FIG. 3, the client then receives or at its own convenience accesses the data. Optionally the client access site computes physical characteristics of the ride based on the data. Either the central server or the client may optionally query the SMTD to elicit a report and initiate a data transmission

EXAMPLE 4

FIG. 4 depicts an illustrative embodiment of SMTD component configuration. In this particular embodiment the SMTD has a means for physical association with a rider or vehicle; a non-exclusive but convenient means for association is where the SMTD is housed in a wrist-watch format. The SMTD in this particular embodiment comprises a receiver. The receiver may be for navigational signals, RFID signals, or other radiofrequency signals. A logic circuit processes data from the receiver to compute parameters such as position, time, or physical parameters from a ride, or to reset a history file. A storage unit stores data from the logic circuit. Data from the storage unit is reported by a reporter that may be a telephonic landline, wireless transmitter, visual display, auditory announcement unit, or other data reporting unit. Reporting may be continuous or one or more aspects of it may optionally be under the control of an RFID device, a history circuit comprising an accelerometer, and or other circuit component. An override element enables the user to initiate reporting and or prevent reporting; it does so in a manner that opposes the direction the switch would have otherwise, and mitigates the consequences of erroneous programming to stop or start. The SMTD has a power supply and corresponding power circuit; to simplify the caricature the power circuit is not depicted in FIG. 4. Illustrative energy-related components for the power supply include batteries, supercapacitors, electrochemical capacitors, fuel cells, solar collection panels, electrical adapters for re-charging, and the like.

EXAMPLE 5

FIG. 5 depicts an illustrative embodiment of signal processing in a SMTD whose display or transmission toggle switch is activated or deactivated according to the invention. When the device identifies that it is not in ride mode, it collects and stores only data from external navigation station signals, to the extent it is configured to receive them and generate a fix on the SMTD's position autonomously. When in ride mode, the SMTD collects, stores and processes data about characteristics of the ride. While the ride mode remains in force, the SMTD continues generating a history file for the ride event. Upon determining that the ride mode is no longer in force, the SMTD queries whether reporting is authorized: a display and or transmission of the data follows if it is, otherwise at least one of the reporting modes is toggled off. For the override case the reporter is under direct control of the user, client or central server.

EXAMPLE 6

A SMTD according to the invention employs a plurality of accelerometers. A first accelerometer resides in a sphere weighted at the bottom, wherein the weighted sphere rests inside a lubricated inversely spherical socket interior, and recognizes the largely seatward direction by the seating orientation of the accelerometer within the socket. At rest or in the time averaged-position gravity determines the downward and thus seatward direction, and thus the attribution of g-forces detected. A second accelerometer gauges acceleration events in directions orthogonal to the seatward first accelerometer, wherein the second accelerometer also resides in the sphere, but is weighted on its nominal hind side, and freely pivots about a nominally vertical axis in response to cornering. A third accelerometer measures angular forces responsible for the pivoting of the orthogonal accelerometer about the nominal vertical axis. An optional fourth accelerometer measures angular forces responsible for rocking of axis of the first accelerometer.

EXAMPLE 7

A SMTD according to the invention employs two accelerometers and a gyroscope in combination in a history to monitor the path of forces acting upon a rider. The SMTD is further equipped with an electronic chronometer such that incidents in a ride event are correlated by time, and speeds and forces are computed from the time and measured parameters.

EXAMPLE 8

A SMTD according to the invention contains a circuit comprising an accelerometer, an altimeter, an electronic chronometer, a computational circuit, a power source and a display screen, all in electrical communication with each other and comprised in a housing for a wrist-watch. After the user initiates the physical tracking protocol for a ride event, the device displays the ride event's current, maximum and average values for the g-force, velocity, altitude, weightlessness, and approximate time at the maxima for each of those values.

EXAMPLE 9

A SMTD according to the invention contains a circuit comprising accelerometers measuring g-forces in seatward, forward, lateral and torque directions, an electronic chronometer, a GPS navigational circuit, a computational circuit, a power source and a display screen, all in electrical communication with each other and comprised in a housing for a calculator housing. After the user initiates the physical tracking protocol for a ride event, the device displays the ride's path, and the maximum g-forces along points in the path in the measured directions, including forward acceleration, bottoming out, cornering, weightlessness, torque, moment of inertia and angular momentum.

EXAMPLE 10

A SMTD according to the invention contains a circuit comprising accelerometers measuring g-forces in seatward, forward, lateral and torque directions, an electronic chronometer, a computational circuit, a power source and a display screen, all in electrical communication with each other and comprised in a pendant placed around the rider's neck on a lanyard. After the user initiates the physical tracking protocol and has completed the ride event, customized queries to the device call up the sequence of values for the full ride at increments of three seconds for seatward g-forces and weightlessness in its loop features, and displays the torque at two second intervals for a twirling ride.

EXAMPLE 11

A SMTD according to the invention provides files for storing tracked histories of 15 ride events lasting up to an hour each. The user names and sets up files using information from RFID transmitters at the gate of a commercial ride. The SMTD has been set to toggle on detection when 1 g force in the forward direction is sustained for 10 seconds, and to save power by toggling off the detection components when the circuit has detected no force over 1.2 g in five minutes. Upon specific queries by the user following the ride, the device's data protocol compares distances, heights, ride times, extremes of g-force, and calculates the bumpiness and vibration based on the brevity and repetitiveness of acceleration incidents during the ride event. The SMTD further comprises a communications link for downloading ride files to another computer.

EXAMPLE 12

A SMTD according to the invention provides journaling files for user comments of up to 500 characters each on general subjects, specific ride histories, and contact information for fellow enthusiasts. The SMTD further comprises an application for uploading user preference files in the form of text in a tabular format with command lines. The customized personal preferences in the SMTD are
  SEAT: >2 g, <5 g
  FORWARD: >2 g, <3 g
  BRAKE: >2 g, <5 g
  LATERAL: >1 g, <2 g
  TORQUE: >1 g, <3 g
  HEIGHT: >300 ft, <NO LIMIT

EXAMPLE 13

For a SMTD according to Example 12, the SMTD's scoring algorithm decrements the preferred range for each parameter, using a default range in the absence of an entered preference unless scoring on that parameter is toggled off by the user. For a given ride, each parameter is assigned between one and five stars, with no stars for falling under the minimum preferred g-value or exceeding the maximum preferred value, and one star for the lowest acceptable value, five stars for the highest. The device sums the respective number of stars awarded for each parameter on a ride with those of the other selected parameters, and averages their values to assign a computed overall score to a ride event, such as 4.2 stars.

EXAMPLE 14

A SMTD according to the invention transmits a text communication wirelessly to a telephone or other communications device, reporting stored ride information and comments, and receives text communications from other SMTDs and the proprietor of a commercial ride, including notices of the hours of operation and when the park is nearing closing time. The proprietor compiles data from the SMTDs to determine points at which the ride is least comfortable and may warrant programmed braking, and offers special prices to users who log regular SMTD messages.

EXAMPLE 15

A SMTD according to the invention contains a plurality of digital games to provide amusement while the rider waits in line for a ride. The games include a trivia game on the most extreme rides, a game identifying activities with their g-forces, a game for avoiding falling off a ride, a promotional game from an amusement park, a game in which falling shapes must be re-oriented and stacked, a game in which a board of squares must be emptied without activating the forbidden squares, and a card solitaire game. The SMTD has a rubberized housing to minimize damage in the event it is dropped when a fellow rider jostles the user while they wait in line. The SMTD is also programmed to distinguish the accelerometric profile of a sharp jarring motion during dropping, from the smooth accelerometric transitions of a ride. Thus the SMTD automatically toggles on under the control of an accelerometer to begin creating a history file after 5 seconds of sustained forward acceleration at 0.5 g, but does not toggle on monitoring or reporting when the SMTD is dropped to the ground from a height of as much as 6 feet. Instead the SMTD is programmed to call the owner's cell phone immediately with its location after such a drop to facilitate recovery of the device before it is lost.

Having described and illustrated specific exemplary embodiments of the invention, it is to be understood that the invention is not limited to those precise embodiments. Various adaptations, modifications, and permutations will occur to persons of ordinary skill in the art without departing from the scope or the spirit of the invention as defined in the appended claims, and are contemplated within the invention.

What is claimed is:

1. A method for assessing and reporting characteristics of a recreational ride event, comprising:
   a. placing a self-motion tracking device (SMTD) in close proximity to a recreational rider or recreational ride vehicle;
   b. determining at a first component of the SMTD motion information about relative motion of the SMTD or position information about a location of the SMTD;
   c. storing motion information or position information from the first component at a second component of the SMTD; and
   d. reporting and optionally qualifying motion information or position information from the first component at a third component of the SMTD;
   wherein the SMTD's self-motion tracking employs one or more accelerometers optionally in combination with a chronometer in a history circuit, optionally employs a navigational circuit, and wherein one or more of the first, second and third components is optionally controlled by an override element or a component that can respond to radio frequency identification signals.

2. The method of claim 1 wherein the reported motion information comprises a cumulative history of acceleration, speed and time of motion as detected by the SMTD under accelerometer control.

3. The method of claim 1 wherein the SMTD's reporting can be periodic, generated in response to a query directly or from a central server or a client, or generated in response to a threshold level of acceleration, angle, velocity or distance detected by the SMTD.

4. The method of claim 1 wherein the stored position information comprises a relative location of a navigational beacon from which the SMTD has received transmitted information, or comprises a calculated location of the rider or vehicle as a function of a relative location of a navigational beacon, and wherein the SMTD further comprises a means for calculating the motion of the rider or vehicle as a function of relative locations of satellites, ground stations and or aquatic stations.

5. The method of claim 1 wherein the SMTD's close proximity to the rider or vehicle is in a manner selected from the group consisting of: handheld; worn as a pin, bracelet, chain, ring, patch, or item of clothing; carried in a pocket, pouch or purse; attached to the interior or exterior of the vehicle; housed in a compartment of the vehicle; or affixed as an integral component of the vehicle.

6. The method of claim 1 wherein the reported motion information from the SMTD is received by or relayed to a central server which then communicates the reported motion information for the rider or vehicle to a client.

7. The method of claim 6 wherein the central server or a device held by the client comprises a means for calculating movement or a location of the rider or vehicle as a function of externally obtained navigational information.

8. The method of claim 6 wherein the central server communicates the reported motion information for the rider or vehicle to the client by means of email or other directed electronic communication or by posting the reported motion information to a web site that is accessible to the client.

* * * * *